(12) United States Patent
Yoshida et al.

(10) Patent No.: US 8,215,813 B2
(45) Date of Patent: Jul. 10, 2012

(54) FLASHER SUPPORT STRUCTURE

(75) Inventors: Naoki Yoshida, Wako (JP); Kazunori Kawame, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 12/723,092

(22) Filed: Mar. 12, 2010

(65) Prior Publication Data

US 2010/0246202 A1    Sep. 30, 2010

(30) Foreign Application Priority Data

Mar. 30, 2009  (JP) ................... 2009-081305
Sep. 15, 2009  (JP) ................... 2009-213342

(51) Int. Cl.
*F21V 19/02* (2006.01)
(52) U.S. Cl. ............. 362/523; 362/498; 362/499
(58) Field of Classification Search .......... 362/523, 362/498, 499
See application file for complete search history.

(56) References Cited

U.S. PATENT DOCUMENTS

| 6,409,366 | B1 * | 6/2002 | Kondo et al. | 362/473 |
| 7,651,251 | B2 * | 1/2010 | Matsumura et al. | 362/494 |
| 2002/0003700 | A1 * | 1/2002 | Selkee | 362/249 |

FOREIGN PATENT DOCUMENTS

JP    61-64044 U    5/1986

* cited by examiner

*Primary Examiner* — Evan Dzierzynski
(74) *Attorney, Agent, or Firm* — Westerman, Hattori, Daniels & Adrian, LLP

(57) ABSTRACT

A flasher support apparatus is provided which lets an external force applied to a lighting apparatus main body escape effectively in a flasher support structure supporting the lighting apparatus main body via a tubular lighting apparatus stay having elasticity. A flasher support structure includes a bottom wall portion disposed on a first axial end of a flasher stay, the bottom wall portion including a mounting hole (a center insertion hole) of a front flasher and an insertion hole (a rear end insertion hole) of a flasher cable; and a peripheral wall portion extending from an outer edge portion of the bottom wall portion toward a vehicle body side so as to widen an opening.

8 Claims, 23 Drawing Sheets

FLASHER SUPPORT STRUCTURE

TECHNICAL FIELD

The present invention relates to a flasher support structure for a saddle-riding type vehicle including a motorcycle.

BACKGROUND OF THE INVENTION

A known flasher support structure includes a tubular lighting apparatus stay having elasticity, via which a lighting apparatus main body is supported on the vehicle body side (see, for example, Japanese Utility Model Laid-open No. Sho 61-64044).

SUMMARY OF THE INVENTION

In the arrangements of the above-cited known structure, the lighting apparatus stay is a simple cylinder having a thick wall. This requires the lighting apparatus stay to include a groove portion formed therein to thereby adjust stiffness, so that the lighting apparatus stay flexes to let an external force escape, should it be applied to a lighting apparatus main body. This tends to lead to an increased cost of, for example, molds.

The present invention lets an external force applied to a lighting apparatus main body escape effectively in a flasher support structure supporting the lighting apparatus main body via a tubular lighting apparatus stay having elasticity.

According to an aspect of the present invention, a flasher support structure has a lighting apparatus main body (for example, a front flasher according to an embodiment of the present invention) that includes a light source (for example, a bulb according to the embodiment of the present invention) disposed thereinside, an electric wire (for example, a flasher cable according to the embodiment of the present invention) feeding electricity to the light source, and a lighting apparatus stay (for example, a flasher stay according to the embodiment of the present invention) elastically supporting the lighting apparatus main body on a vehicle body side, the lighting apparatus stay being formed into a tubular shape so as to accommodate the electric wire thereinside, and having a first axial end that supports the lighting apparatus main body and a second axial end that is supported on the vehicle body side. According to a first characteristic of the present invention, the flasher support structure includes a bottom wall portion (for example, a bottom wall portion according to the embodiment of the present invention) disposed on the first axial end of the lighting apparatus stay, the bottom wall portion including a mounting hole (for example, a center insertion hole according to the embodiment of the present invention) of the lighting apparatus main body and an insertion hole (for example, a rear end insertion hole according to the embodiment of the present invention) of the electric wire; and a side wall portion (for example, a peripheral wall portion according to the embodiment of the present invention) extending from an outer edge portion of the bottom wall portion toward the vehicle body side such that a cross-sectional area of the side wall portion gradually increases from the bottom wall portion to the vehicle body side.

According to a second characteristic of the present invention, the side wall portion has a polygonal shape in cross section.

According to a third characteristic of the present invention, the side wall portion includes a rib (for example, a bulge portion according to the embodiment of the present invention) extending from the bottom wall to a midway point between the bottom wall portion and the vehicle body side portion.

According to a fourth characteristic of the present invention, the rib is a bulge portion formed so as to accommodate the electric wire.

According to a fifth characteristic of the present invention, the side wall portion includes a bent portion (for example, bent portions according to the embodiment of the present invention) such that the cross-area of the side wall portion gradually increases from the bottom wall portion to the bent portion at a fast rate and the cross-sectional area of the side wall portion gradually increases from the bent portion to the vehicle body side at a second rate which is different from the first rate.

According to a sixth characteristic of the present invention, the bent portion is bent to form a valley shape that is recessed towards the interior of the lighting apparatus stay.

According to a seventh characteristic of the present invention, the lighting apparatus stay is angled so that a first axial end side thereof is higher than a second end side.

According to an eighth characteristic of the present invention, the flasher support structure further includes a lighting apparatus cover (for example, a flasher cover according to the embodiment of the present invention) disposed on the vehicle body side. The lighting apparatus cover is formed of an elastic body covering the lighting apparatus stay.

According to a ninth characteristic of the present invention, the lighting apparatus cover includes an opening (for example, an opening according to the embodiment of the present invention) through which the lighting apparatus stay or the lighting apparatus main body is passed through. Further, the opening has a shape that corresponds to a portion (for example, a shaft portion according to the embodiment of the present invention) to pass therethrough.

According to a tenth characteristic of the present invention, the flasher support structure further includes a leg shield (for example, a leg shield according to the embodiment of the present invention) covering legs of a rider, the leg shield including a front cover (for example, a front side cover according to the embodiment of the present invention) covering a forward-facing part of a vehicle and an inner cover (for example, a front inner cover 33 according to the embodiment of the present invention) covering a rearward facing part of the vehicle. The lighting apparatus stay is supported at an area near a joint between the front cover and the inner cover by at least one of the front cover and the inner cover (for example, the front side cover according to the embodiment of the present invention) and the lighting apparatus cover covers a portion of the front cover and the inner cover.

According to the first characteristic of the present invention, the side wall portion of the tubular lighting apparatus stay is formed substantially into a taper having the opening wider toward the vehicle body side. This allows the lighting apparatus stay to tend to buckle when an external force is applied thereto, so that the external force can be effectively made to escape.

The second characteristic of the present invention results in the side wall portion having planar portions and corner portions. As compared with a simple curved surface having a circular or elliptic cross section, the arrangement allows the lighting apparatus stay to buckle more easily when the external force is applied.

According to the third characteristic of the present invention, the lighting apparatus stay tends to buckle more easily with a rib break as a proximal point.

According to the fourth characteristic of the present invention, the bulge portion for accommodating the electric wire can be used to set the proximal point of buckling of the lighting apparatus stay.

According to the fifth characteristic of the present invention, the lighting apparatus stay can be made to buckle even more easily with the bent portion as a proximal point.

According to the sixth characteristic of the present invention, when the lighting apparatus stay buckles, the side wall portion is folded inwardly of the lighting apparatus stay. This allows parts to be disposed around the lighting apparatus stay easily.

According to the seventh characteristic of the present invention, the lighting apparatus stay can be made to buckle even more easily with a lateral load applied thereto.

According to the eighth characteristic of the present invention, displacement of the lighting apparatus main body can be followed upon deformation of the lighting apparatus stay, while improved appearance is ensured.

According to the ninth characteristic of the present invention, even the opening in the lighting apparatus cover can support the lighting apparatus stay and the lighting apparatus main body, so that vibration of the lighting apparatus main body can be effectively reduced.

According to the tenth characteristic of the present invention, the joint between the front cover and the inner cover can be used to form easily a portion through which the lighting apparatus stay is passed. Further, the area around the lighting apparatus stay is covered with the lighting apparatus cover for improved appearance.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
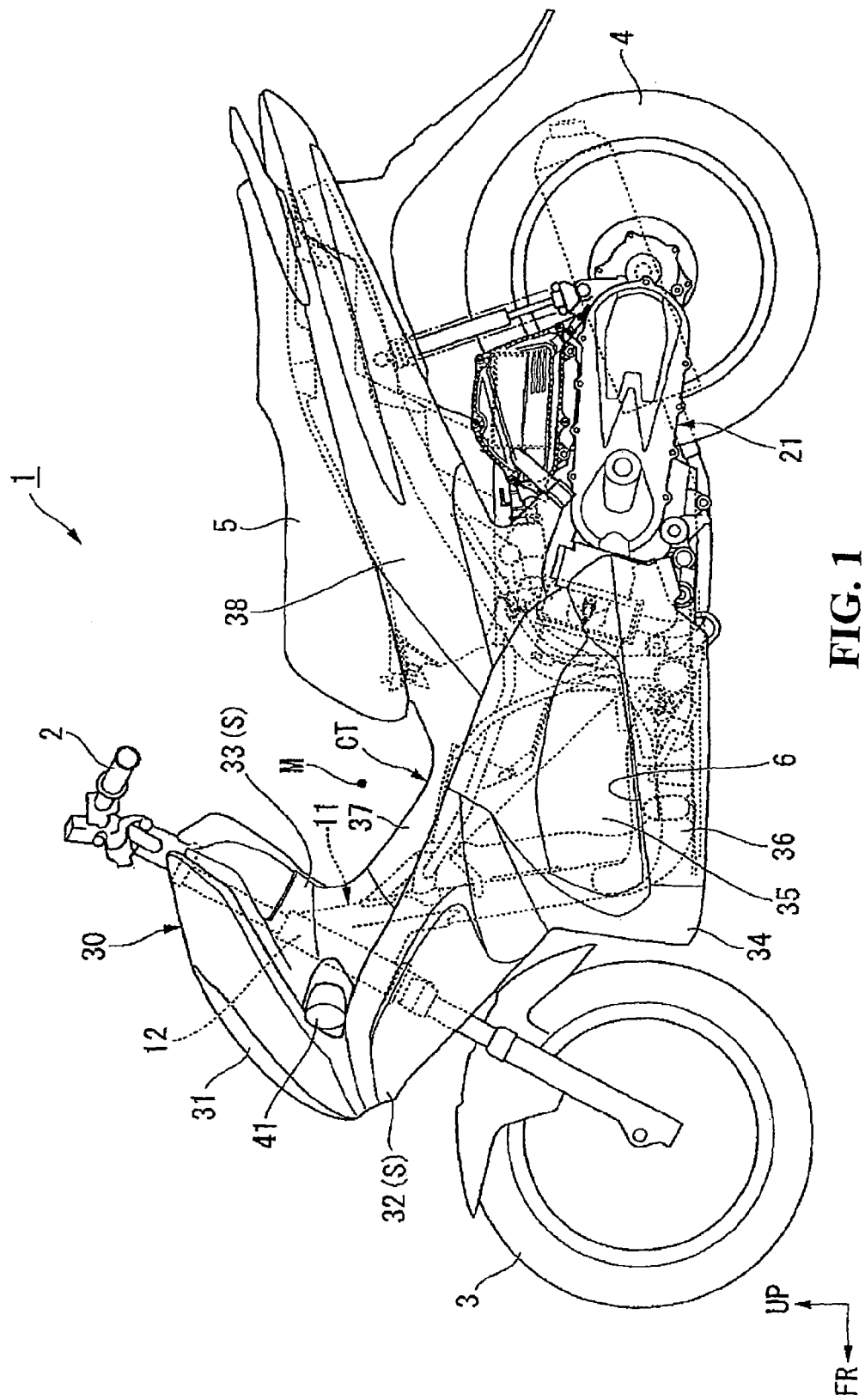
FIG. 1 is a left side elevational view showing a motorcycle according to an embodiment of the present invention.
Figure 2:
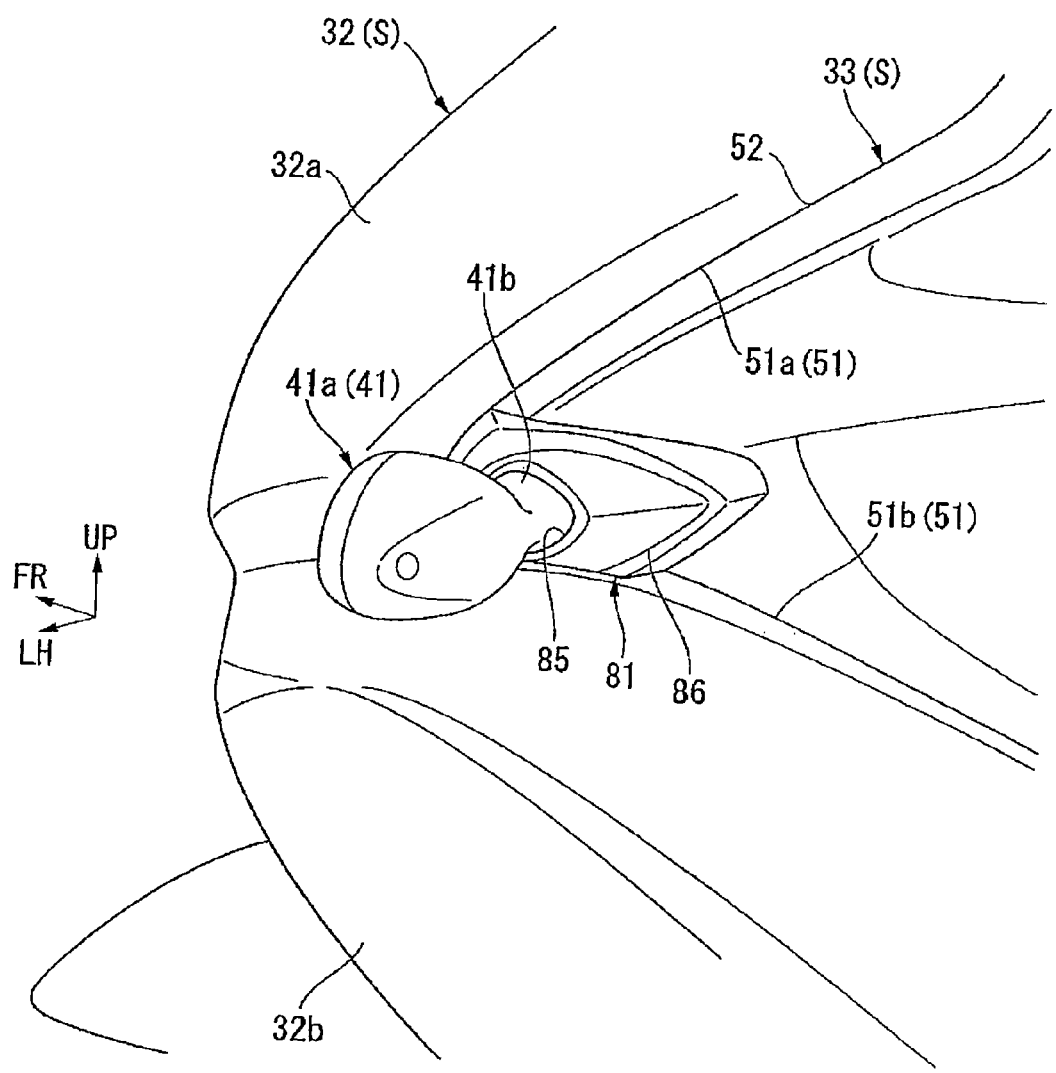
FIG. 2 is a perspective view showing an area around a left front flasher of the motorcycle as viewed from an obliquely upward and rearward direction.

Specific embodiments to which the present invention is applied will be described below with reference to the accompanying drawings. Throughout the descriptions given hereunder, longitudinal, lateral, and other directions are the same as those in the vehicle. In the drawings, an arrow FR denotes a vehicle forward direction, an arrow LH denotes a vehicle leftward direction, and an arrow UP denotes a vehicle upward direction, respectively.

First Embodiment

A scooter type motorcycle (saddle-riding type vehicle) 1 shown in FIG. 1 includes a front wheel 3 steered by a handlebar 2 and a rear wheel 4 driven by a swing unit 21. Steering system parts including the handlebar 2 and the front wheel 3 are steerably pivoted on a head pipe 12 at a front end of a vehicle body frame 11. The swing unit 21 has a front portion on a lower side pivoted vertically swingably at a lower portion in a rear side of the vehicle body frame 11. The motorcycle 1 also includes a straddle portion M disposed between the handlebar 2 and a saddle-riding seat 5, on which an occupant sits, disposed at a vehicle body rear portion. The straddle portion M is relatively low in height. Left and right floor steps 6 are disposed on both left and right sides of the straddle portion M. The occupant sitting on the seat 5 can rest his or her feet on the floor steps 6. The motorcycle 1 further includes a center tunnel portion CT between the left and right floor steps 6. The center tunnel portion CT is an upwardly protruding bulge extending longitudinally downwardly toward the rear.

A cowling 30 covers the vehicle body of the motorcycle 1. The cowling 30 includes a front center cover 31, left and right front side covers 32, a front inner cover 33, left and right floor front covers 34, left and right center side covers 35, left and right floor side covers 36, a center cover 37, and left and right rear side covers 38. Specifically, the front center cover 31 covers an area around the head pipe 12 from a forward direction. The left and right front side covers 32 cover the area around the head pipe 12 from an obliquely front outside. The front inner cover 33 covers the area around the head pipe 12 from a rearward direction. The left and right floor front covers 34 are continuous downwardly with the left and right front side covers 32. The left and right center side covers 35 are continuous with upper rearward portions of the left and right floor front covers 34 to form sides of the center tunnel portion CT. The left and right floor side covers 36 are continuous with lower rearward portions of the left and right floor front covers 34. The center cover 37 is continuous rearwardly with the front inner cover 33 to form an upper surface of the center tunnel portion CT. The left and right rear side covers 38 cover the vehicle body rear portion from sides. Each of the covers 31 to 38 is formed mainly from a synthetic resin. The substantially horizontal floor steps 6 are disposed upwardly of the left and right floor side covers 36.

The left and right front side covers 32 constitute left and right outside portions of a vehicle body front portion. The front inner cover 33 is disposed to extend laterally in full width of the vehicle body front portion. The left and right front side covers 32 and left and right side portions of the front inner cover 33 mainly form left and right leg shields S that cover legs of the occupant sitting on the seat 5 from a forward direction.

Figure 8:
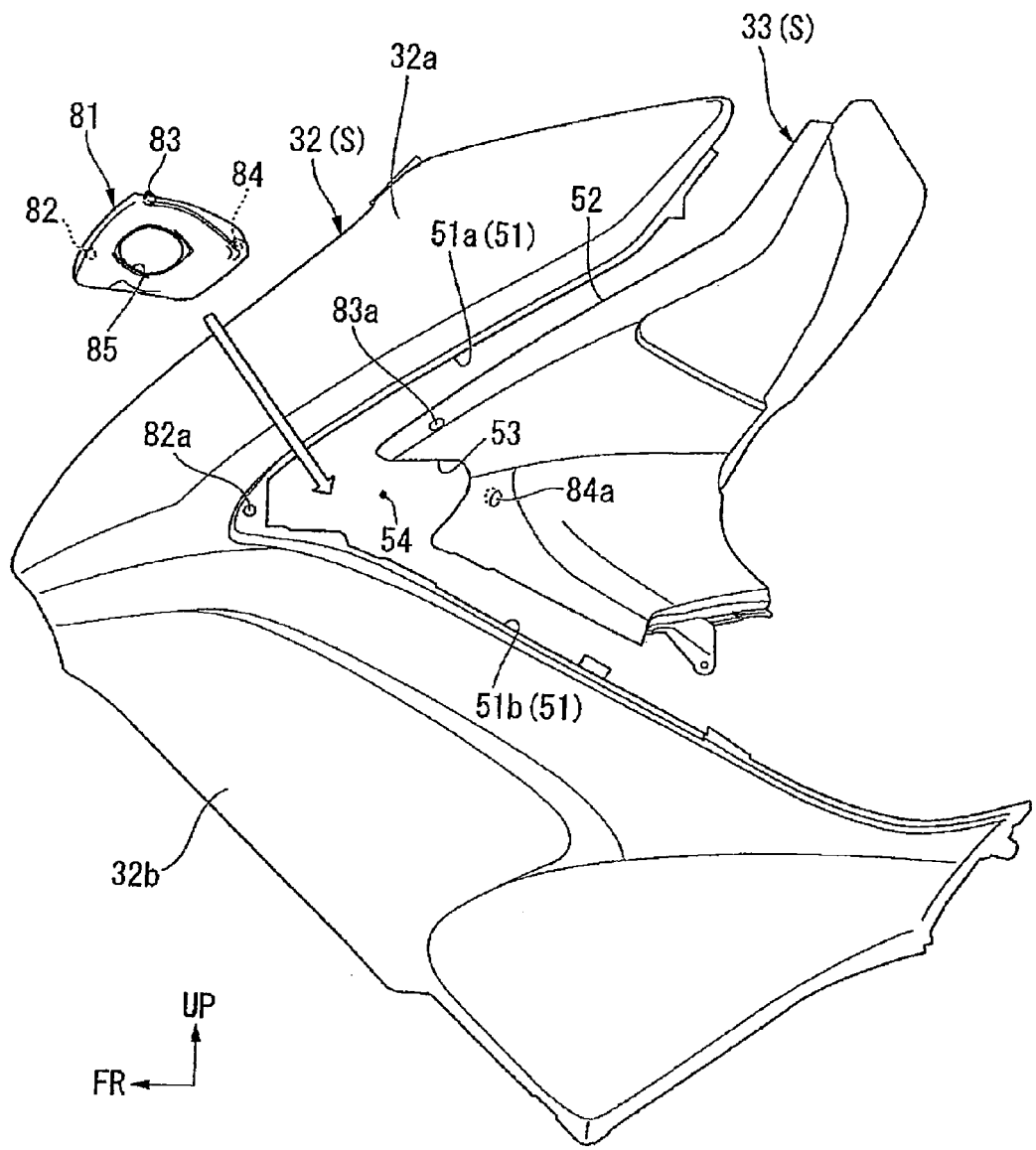
FIG. 8 is an exploded perspective view showing a left leg shield of the motorcycle.
Figure 9:
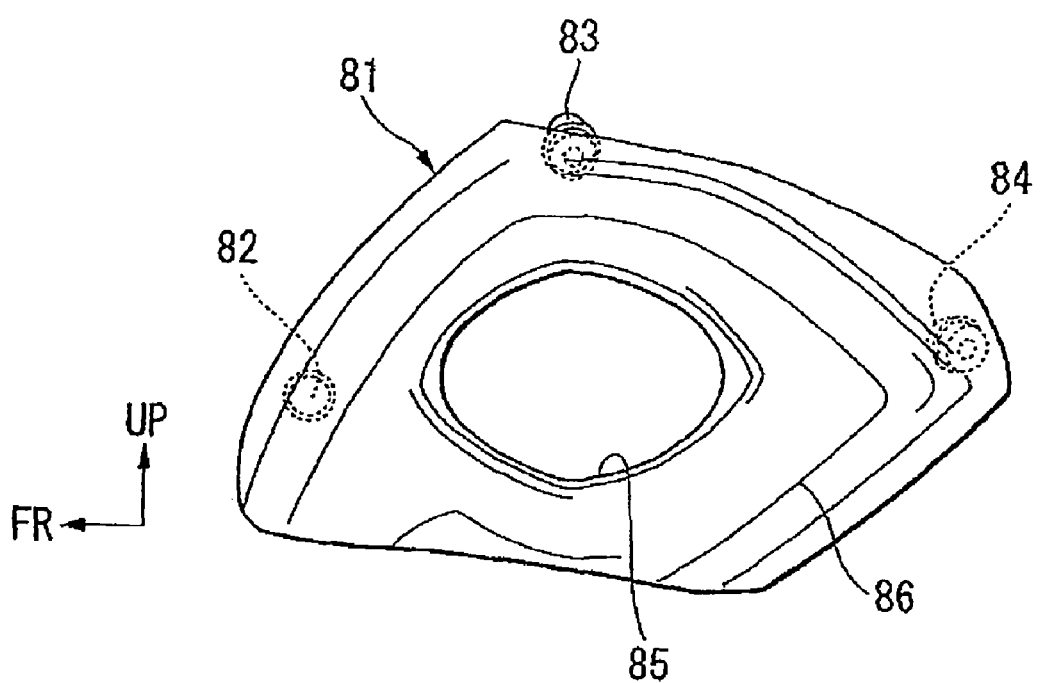
FIG. 9 is a side elevational view showing the flasher cover.
Figure 10:
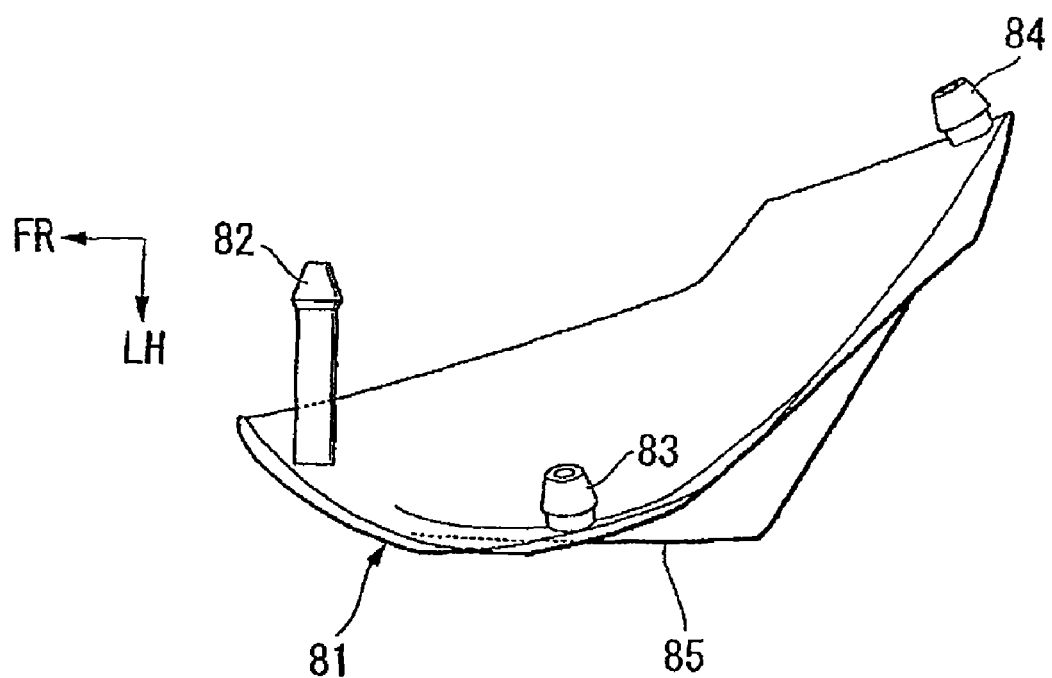
FIG. 10 is a top plan view showing the flasher cover.

Referring also to FIG. 8, the front side cover 32 integrates a front side upper portion 32a and a front side lower portion 32b, formed substantially into a forwardly protruding V shape in a side view. Specifically, the front side upper portion 32a is inclined upwardly toward the rear and the front side lower portion 32b is inclined downwardly toward the rear. The front side cover 32 has an outside edge portion (rear edge portion) 51. The outside edge portion 51 is formed substantially into a forwardly protruding V shape in the side view. The outside edge portion 51 includes an upper outside edge portion 52a of the front side upper portion 32a that is inclined upwardly toward the rear and a lower outside edge portion 52b of the front side lower portion 32b that is inclined downwardly toward the rear. The front inner cover 33 has an outside edge portion 52 that is again formed substantially into a forwardly protruding V shape in the side view so as to be aligned with the outside edge portion 51 of the front side cover 32. The left and right front side covers 32 and the front inner cover 33 are each arranged symmetrically.

Figure 3:
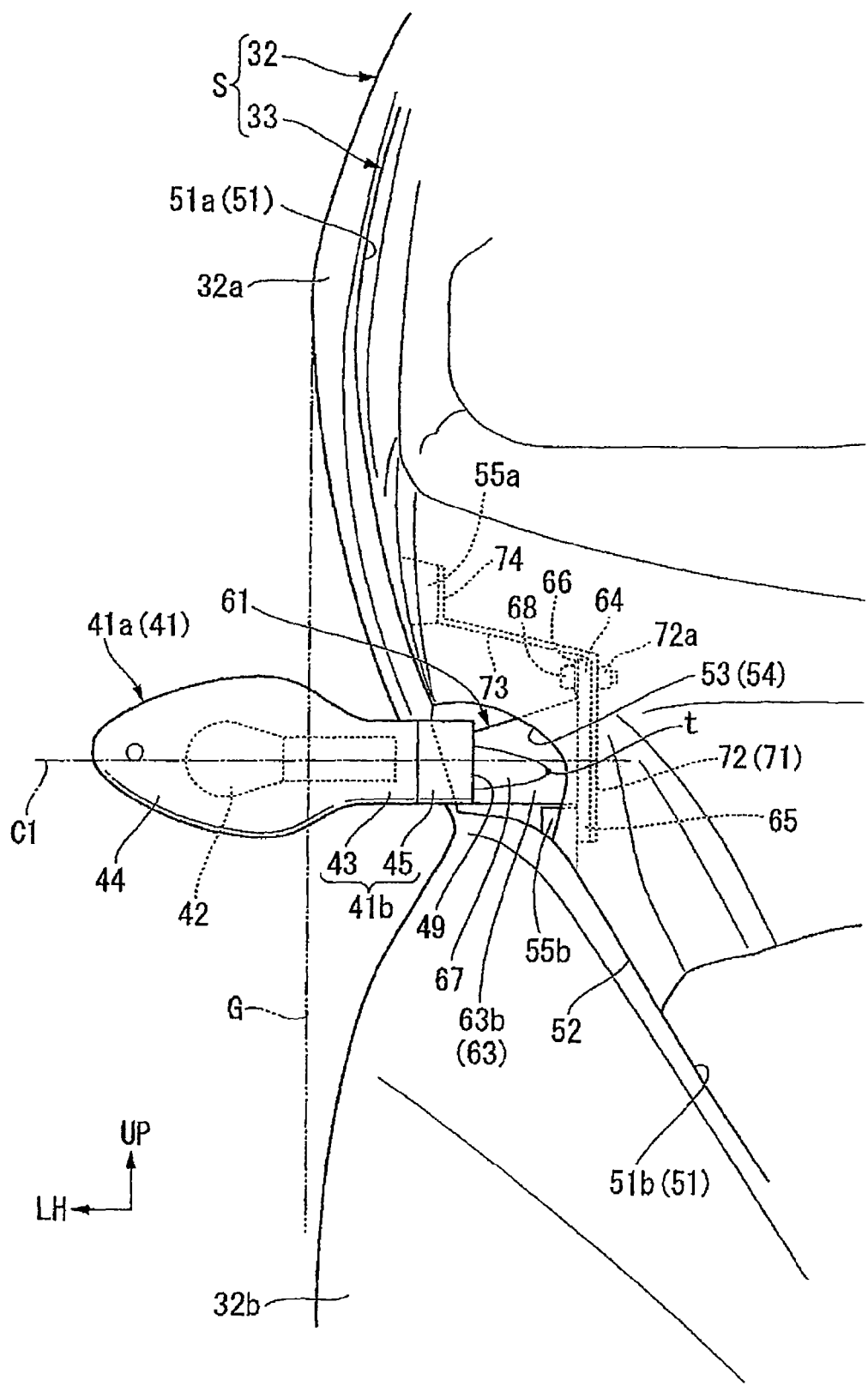
FIG. 3 is a rear elevational view of the area around the left front flasher.
Figure 4:
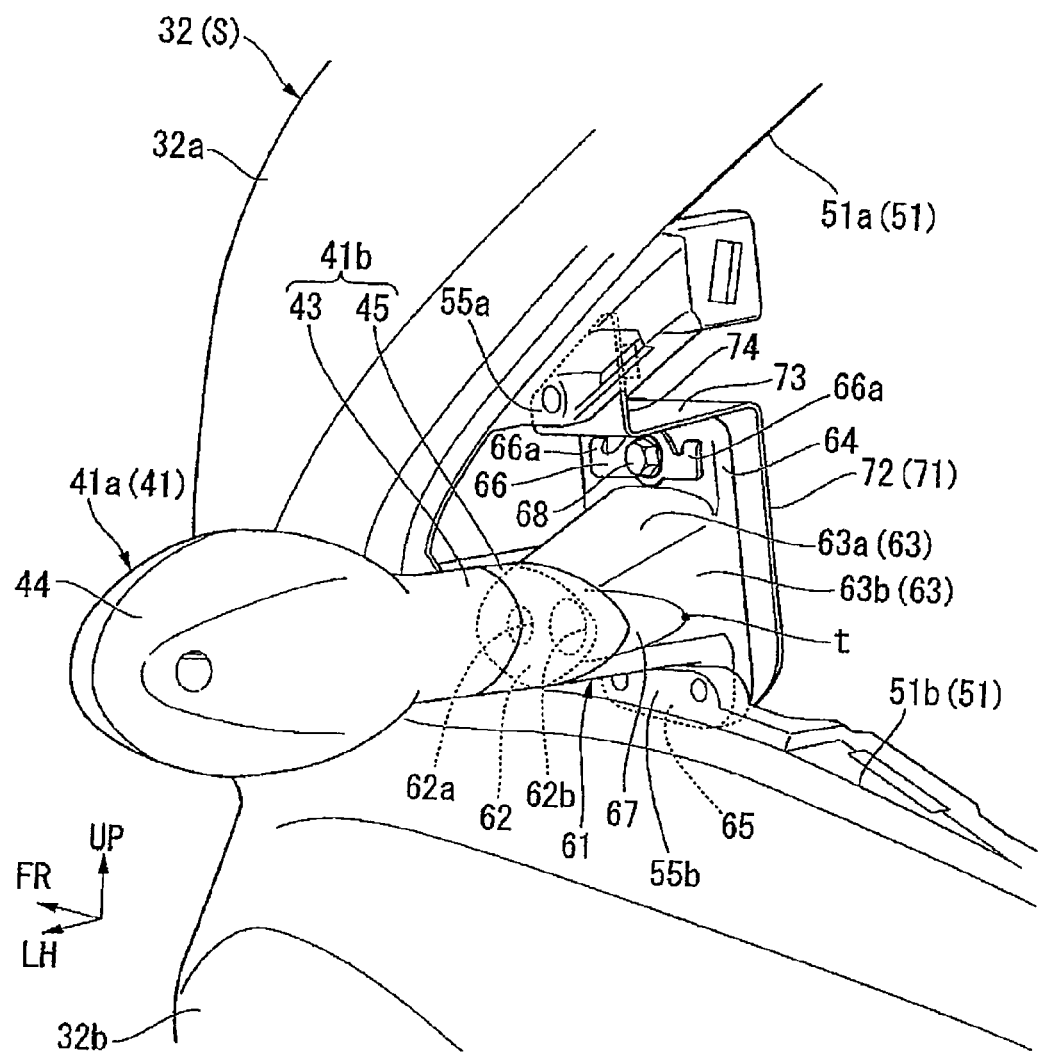
FIG. 4 is a perspective view showing the area around the left front flasher with a flasher cover removed, as viewed from an obliquely upward and rearward direction.

Referring also to FIGS. 3 and 4, the front inner cover 33 includes a cutout 53 made therein at a front end portion on the outside at the left and right. The cutout 53 is formed substantially into a rearwardly protruding V shape in the side view. The cutout 53 and a front end portion of the outside edge portion 51 of each of the left and right front side covers 32 form an opening 54 therebetween. The opening 54 is shaped substantially into a rhombus in the side view. A flasher stay 61 that is continuous with a shaft portion 41b of a front flasher 41 reaches into an inside of the cowling 30 through the opening 54. The flasher stay 61 has a leading end fixed onto a support bracket 71 to be described later. The shaft portion 41b has an intermediate portion that penetrates through a flasher cover 81 mounted in the opening 54 on the outside in a vehicle width direction in a condition of being in alignment therewith. This results in the front flasher 41 being supported at the front portion on the outside of the cowling 30 via, for example, the flasher stay 61 and the flasher cover 81.

Figure 5:
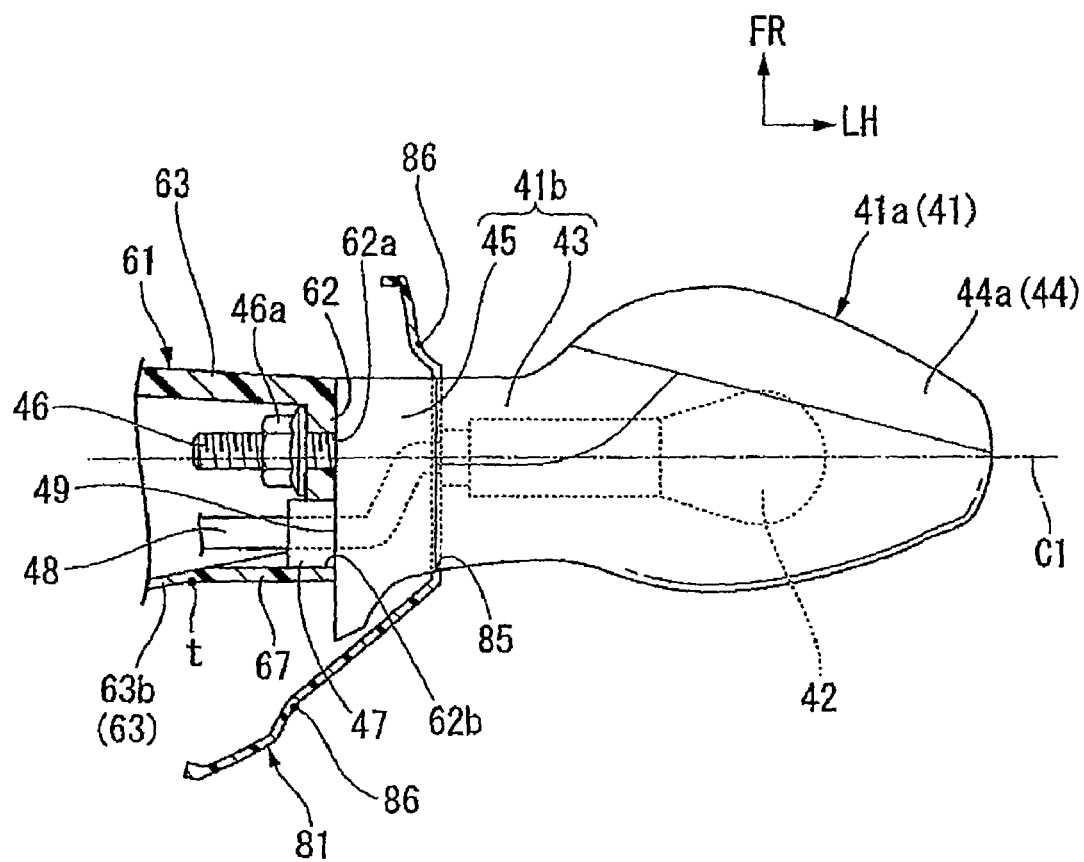
FIG. 5 is a bottom plan view showing the left front flasher.

Referring to FIGS. 3 and 5, the front flasher 41 is disposed so as to protrude to the outside in the vehicle width direction (lateral direction) from the opening 54. The front flasher 41 includes an oval-shaped flasher main body 41a and the shaft portion 41b. Specifically, the flasher main body 41a has a light source that emits light. The shaft portion 41b extends inwardly in the vehicle width direction of the flasher main body 41a. The flasher main body 41a includes a bulb 42 as a light source accommodated inside a light body 44 that forms an appearance of the flasher main body 41a. The light body 44 has a front surface that forms a flasher lens 44a covering the bulb 42 from a forward direction.

The shaft portion 41b is formed to include an extension portion 43 and an extension 45. Specifically, the extension portion 43 is integrally formed on the inside in the vehicle width direction of the light body 44 (a proximal end side). The extension 45 is continuous with the leading end side of the extension portion 43. A threaded shaft 46 and a positioning protrusion 47 are disposed on an end face 49 on the inside in the vehicle width direction of the extension 45 (shaft portion 41b). The threaded shaft 46 protrudes inwardly in the vehicle width direction. The positioning protrusion 47 again protrudes inwardly in the vehicle width direction at a position rearward of the threaded shaft 46. The positioning protrusion 47 is of a cylindrical shape having a shorter length and a larger diameter than the threaded shaft 46. A flasher cable 48 is derived to an outside of the light body 44 through an inside of the positioning protrusion 47. The flasher cable 48 is connected to a main harness not shown at a front portion on the inside of the cowling 30.

The front flasher 41 has the flasher stay 61 integrally connected to the leading end side of the shaft portion 41b as detailed in the following. Specifically, the end face 49 of the shaft portion 41b is brought into abutment on an outside surface of a bottom wall portion 62 that is an outside end portion in the vehicle width direction of the flasher stay 61. The threaded shaft 46 and the positioning protrusion 47 are passed through the bottom wall portion 62 and a nut 46a is threadedly screwed and tightened on the threaded shaft 46 from the inside in the vehicle width direction of the bottom wall portion 62 (from the inside of the flasher stay 61). In FIGS. 3 and 5, reference symbol C1 denotes an axis extending in a direction in which the shaft portion 41b and the flasher stay 61 extend.

Figure 6:
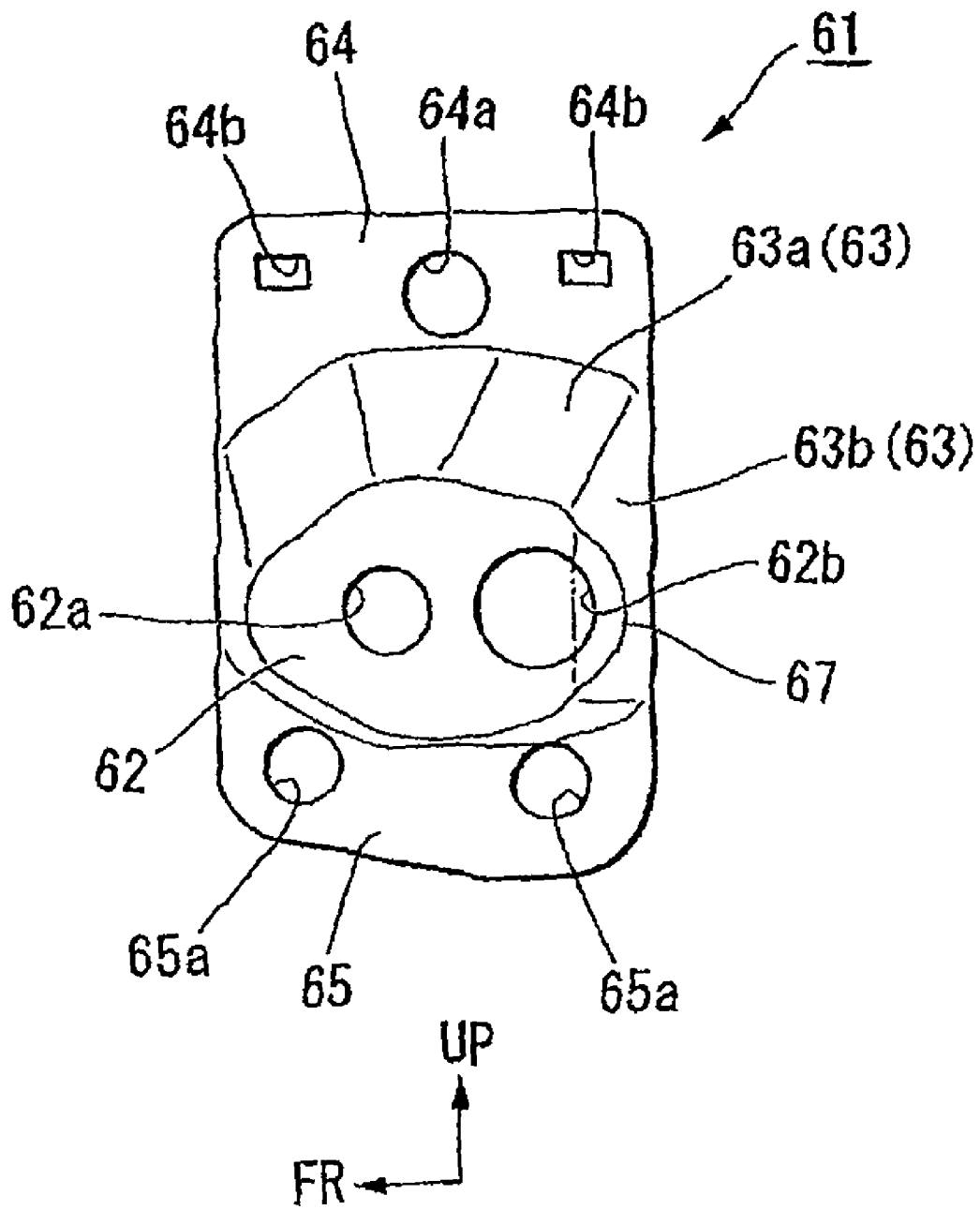
FIG. 6 is a side elevational view showing a flasher stay that supports the left front flasher on the vehicle body side.
Figure 7:
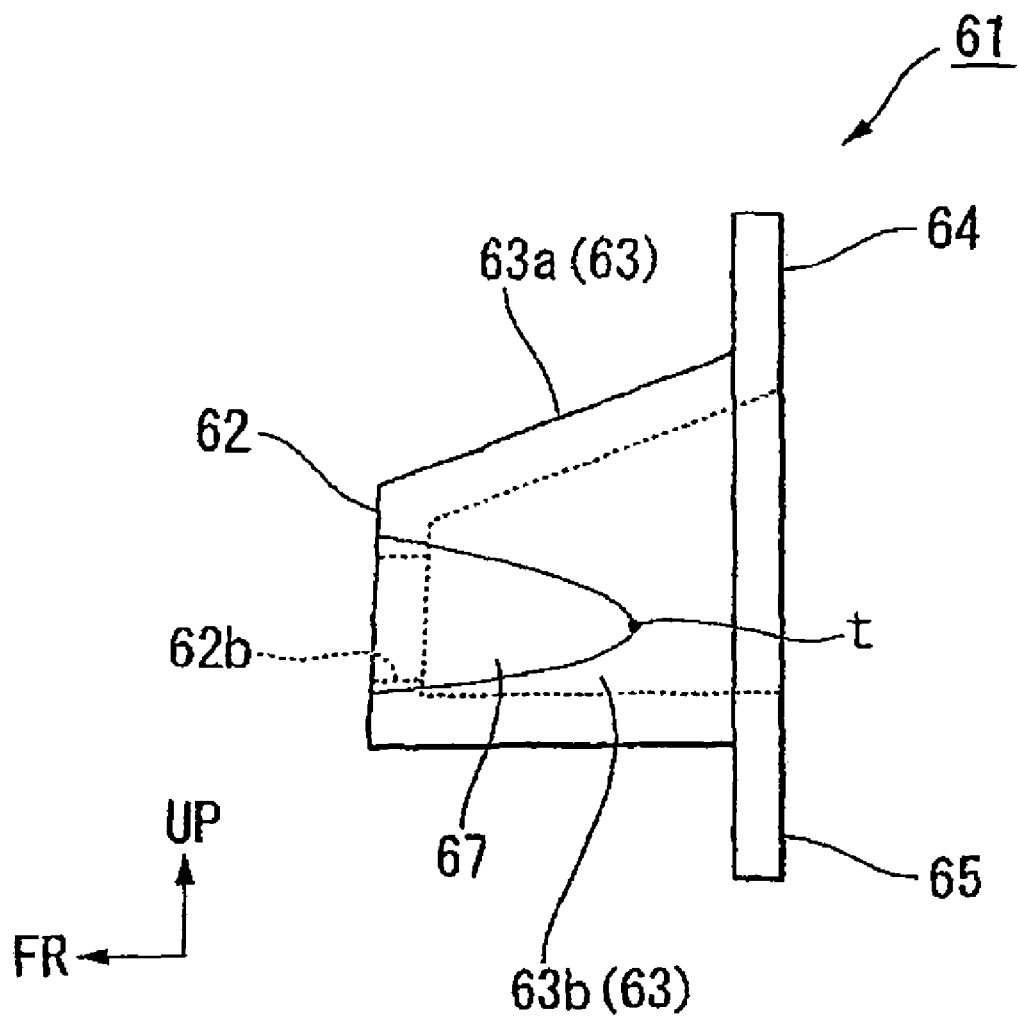
FIG. 7 is a rear elevational view showing the flasher stay.

Referring also to FIGS. 4, 6, and 7, the flasher stay 61 is a one-piece molding formed from an elastic material, for example, rubber. The flasher stay 61 is formed into a cup shape that opens toward the inside in the vehicle width direction (a tube shape with a bottom). Specifically, the flasher stay 61 is structured to include the bottom wall portion 62 and a peripheral wall portion 63. More specifically, the bottom wall portion 62 is a planar surface extending substantially orthogonally to the lateral direction. The peripheral wall portion 63 extends inwardly in the vehicle width direction from an outer peripheral edge of the bottom wall portion 62, while widening a cross-sectional area (opening) of the flasher stay 61 (widening an outline and an internal space). The flasher stay 61 generally has a substantially uniform wall thickness.

Upper and lower fixing flanges 64, 65 that extend substantially orthogonally to the lateral direction are disposed on a leading end of the peripheral wall portion 63 at upper and lower ends. The upper fixing flange 64 is connected to an upper portion of the support bracket 71 by fastening a bolt 68 inserted from the outside in the vehicle width direction to the upper portion of the support bracket 71. A washer member 66 that forms a seat of the bolt 68 is disposed on an outside surface of the upper fixing flange 64. The washer member 66 is long in the longitudinal direction. Lock pawls 66a relative to the upper fixing flange 64 are disposed at front and rear end portions of the washer member 66. Note that the upper fixing flange 64 includes an insertion hole 64a for the bolt 68 and lock holes 64b for the lock pawls 66a made therein.

The lower fixing flange 65, on the other hand, is connected to a lower fixing portion 55b disposed on the lower outside edge portion 52b of the front side cover 32 by a pair of front and rear fixing means, for example, tapping screws in the following condition: specifically, the lower fixing flange 65 adjoins the lower fixing portion 55b on the inside in the vehicle width direction at a lower portion of the opening 54 and with a lower portion of the support bracket 71 adjoining the inside in the vehicle width direction of the lower fixing flange 65, so that the lower fixing flange 65 is clamped between the lower portion of the support bracket 71 and the lower fixing portion 55*b*. Note that the lower fixing flange 65 includes an insertion hole 65*a* for the fixing means made therein.

The bottom wall portion 62 is a longitudinally long, substantially elliptic shape in the side view. The bottom wall portion 62 includes a center insertion hole 62*a* and a rear end insertion hole 62*b* made therein. The center insertion hole 62*a* is made substantially at a central portion of the bottom wall portion 62, through which the threaded shaft 46 is to be passed through. The rear end insertion hole 62*b* having a relatively large diameter is made at a rear portion of the bottom wall portion 62, through which the positioning protrusion 47 is to be passed through. Note here that the bottom wall portion 62 has a rear end portion that bulges rearwardly to be circularly arcuate to ensure that the rear end insertion hole 62*b* can be formed therein.

The peripheral wall portion 63 is formed into a tubular shape having a substantially polygonal shape in cross section by combining a plurality of long planar portions extending in the direction of the axis C1 (axial direction, lateral direction). An upper end portion (upper wall portion 63*a*) of the peripheral wall portion 63, in particular, is inclined relatively sharply with respect to the axial direction of the flasher stay 61 and includes a plurality of ridge lines (corner portions) between the planar portions.

In addition, the peripheral wall portion 63 has a rear end portion (rear wall portion 63*b*) that is formed to follow along an inclined plane so as to be disposed more forwardly at outer sides in the vehicle width direction. Further, a bulge portion 67 that corresponds to the bulged rear end portion of the bottom wall portion 62 is formed at a portion of the rear wall portion 63*b* on the outside in the vehicle width direction. The bulge portion 67 is formed into a cylinder extending along the lateral direction. The positioning protrusion 47 and the flasher cable 48 are accommodated inside the flasher stay 61 through the inside of the bulge portion 67. The bulge portion 67 functions also as a rib that reinforces the rear wall portion 63*b* on the outside in the vehicle width direction. The bulge portion 67 has an inside end t that serves, when the rear wall portion 63*b* buckles, as a proximal point of the buckling.

The flasher stay 61 has no grooves or the like for stiffness adjustment and is formed through mold removal only in the axial direction thereof (the direction along the axis C1), so that a mold cost for the flasher stay 61 can be held low.

Referring to FIGS. 3 and 4, the support bracket 71 formed, for example, by bending a steel sheet is disposed on the inside in the vehicle width direction of the opening 54 in the cowling 30. The support bracket 71 is formed to include integrally a support plate portion 72, an upper wall portion 73, and an upper fixing flange 74. Specifically, the support plate portion 72 is a planar, substantially rectangular shape that is substantially orthogonal to the lateral direction on the inside in the vehicle width direction of the opening 54. The upper wall portion 73 extends toward the outside in the vehicle width direction from an upper edge of the support plate portion 72. The upper fixing flange 74 extends upwardly from an outside edge of the upper wall portion 73.

The support plate portion 72 includes a nut and a starting hole thereof disposed at an upper portion thereof, with which the bolt 68 is to be threadedly screwed. The support plate portion 72 further includes an insertion hole made at a lower portion thereof, the insertion hole to be used for fixing means relative to the lower fixing portion 55*b* (FIG. 3 shows a nut 72*a* only). The upper fixing flange 74 is connected to an upper fixing portion 55*a* disposed at an upper outside edge portion 51*a* of the front side cover 32 at an upper portion in the opening 54 using single fixing means, such as a tapping screw.

Referring now to FIG. 3, the outside portion of the front side cover 32 (leg shield S) is recessed toward the inside in the vehicle width direction with the lower outside edge portion 52*b* of the front side cover 32 as a valley. Accordingly, the upper fixing flange 74 of the support bracket 71 is displaced toward the outside in the vehicle width direction by way of the upper wall portion 73.

Additionally, the opening 54 and the flasher stay 61 are disposed inside in the vehicle width direction of an outermost position of the front side cover 32 (leg shield S) (specifically, a line G in FIG. 3). This helps make the opening 54 less noticeable and allows the flasher stay 61 to be elastically deformed when an external force is applied to the front flasher 41.

Referring to FIGS. 2, 5, 8, 9, and 10, the flasher cover 81 is a one-piece molding formed of an elastic material, for example, rubber. The flasher cover 81 is an outwardly protruding bulge in the vehicle width direction and shaped substantially into a rhombus in the side view like the opening 54. The flasher cover 81 is attached to the opening 54 from the outside in the vehicle width direction such that an outer peripheral portion thereof is in tight contact from the outside in the vehicle width direction with a surrounding portion of the opening 54.

The flasher cover 81 is mounted on the cowling 30 across the front side cover 32 and the front inner cover 33 as detailed in the following. Specifically, a front lock pin 82 disposed in a protruding condition at a front end portion of the flasher cover 81 on the inside in the vehicle width direction is engaged disengageably from the inside in the vehicle width direction with a front lock hole 82*a* made at a front end portion of an outside edge of the front side cover 32; and an upper lock protrusion 83 and a rear lock protrusion 84 disposed in a protruding condition at an upper end portion and a rear end portion of the flasher cover 81 on the inside in the vehicle width direction are engaged disengageably from the outside in the vehicle width direction with an upper lock hole 83*a* and a rear lock hole 84*a* made in the front inner cover 33 at positions upward and rearward of the opening 54, respectively.

The outwardly protruding bulge in the vehicle width direction of the flasher cover 81 has an apex portion that includes an opening 85 made therein, through which the shaft portion 41*b* of the front flasher 41 penetrates in an aligned condition. Note here that the shaft portion 41*b* of the front flasher 41 has a longitudinally long, substantially elliptic shape in cross section like the shape of the bottom wall of the flasher stay 61 in its side view. The opening 85 in the flasher cover 81 is formed into a longitudinally long, substantially elliptic shape so as to be aligned with the cross-sectional shape of the shaft portion 41*b* of the front flasher 41.

If, for example, an external force from the outside in the vehicle width direction toward the inside in the vehicle width direction (an external force from an axial outside) is applied to the front flasher 41, the area around the upper wall portion 63*a* having a sharp inclination relative to the axis C1, in particular, of the flasher stay 61 tends to buckle easily, so that the external force escapes. This also holds true when an upward external force is applied from a downward direction to the front flasher 41. In these cases, displacement of the front flasher 41 is permissible also by the flasher cover 81 being formed from an elastic body.

Additionally, when an external force is applied to the front flasher 41 from a forward direction to a rearward direction, an area of the flasher stay 61, in particular, an area around the rear wall portion 63b tends to buckle, so that the external force escapes.

As such, forming the elastic tubular flasher stay 61 continuous with the shaft portion 41b of the front flasher 41 substantially into a taper allows each of the abovementioned external forces that tend to be applied to the front flasher 41 of the motorcycle 1 to escape effectively.

Note here that the flasher cover 81 includes a bent portion 86 formed to be continuous in a valley-like (groove-like) shape between the opening 85 in the flasher cover 81 and lock portions (the front lock pin 82 and the upper and rear lock protrusions 83, 84) relative to the cowling 30. The bent portion 86 helps permit displacement when an external force is applied to the front flasher 41. The bent portion 86, though formed in the valley-like shape, may be in a peak-like shape.

As described heretofore, the flasher support structure according to the embodiment of the present invention has the front flasher 41 that includes the light source (bulb 42) disposed thereinside, the flasher cable 48 feeding electricity to the light source, and the flasher stay 61 elastically supporting the front flasher 41 on the vehicle body side, the flasher stay 61 being formed into a tubular shape so as to accommodate the flasher cable 48 thereinside, and having the first axial end that supports the front flasher 41 and the second axial end that is supported on the vehicle body side. The flasher support structure includes the bottom wall portion 62 disposed on the first axial end of the flasher stay 61, the bottom wall portion 62 including the mounting hole (center insertion hole 62a) of the front flasher 41 and the insertion hole (rear end insertion hole 62b) of the flasher cable 48; and the peripheral wall portion 63 extending from the outer edge portion of the bottom wall portion 62 toward the vehicle body side so as to widen the opening.

According to the foregoing arrangements, the peripheral wall portion 63 of the tubular flasher stay 61 is formed substantially into the taper having the opening wider toward the vehicle body side. This allows the flasher stay 61 to tend to buckle when an external force (in particular, the external force from the axial outside of the flasher stay 61) is applied thereto, so that the external force can be effectively made to escape.

Additionally, in the flasher support structure, the peripheral wall portion 63 has the polygonal shape in cross section, resulting in the peripheral wall portion 63 having planar portions and corner portions. As compared with a simple curved surface having a circular or elliptic cross section, the arrangement allows the flasher stay 61 to buckle more easily when the external force is applied.

Additionally, in the flasher support structure, the peripheral wall portion 63 includes the rib (bulge portion 67) that extends from the bottom wall portion 62 toward the vehicle body side and breaks midway. This allows the flasher stay 61 to tend to buckle easily with the rib break as the proximal point.

Additionally, in the flasher support structure, the rib is the bulge portion 67 formed so as to circumvent the flasher cable 48. The bulge portion 67 for circumventing the flasher cable 48 can be used to set the proximal point of buckling of the flasher stay 61.

Additionally, in the flasher support structure, the flasher cover 81 is disposed on the vehicle body side. The flasher cover 81 is formed of an elastic body covering the flasher stay 61. Displacement of the front flasher 41 can be followed upon deformation of the flasher stay 61, while improved appearance is ensured.

Additionally, in the flasher support structure, the flasher cover 81 includes the opening 85 through which shaft portion 41b of the front flasher 41 is passed through. Further, the opening 85 has a shape that corresponds to the shaft portion 41b to pass therethrough. Even the opening 85 in the flasher cover 81 can support the front flasher 41, so that vibration of the front flasher 41 can be effectively reduced.

Additionally, the flasher support structure further includes the leg shield S covering forwardly of the legs of the rider, the leg shield S including the front side cover 32 facing forwardly of the vehicle and the front inner cover 33 facing rearwardly of the vehicle. The flasher stay 61 is supported at the area near the joint between the front side cover 32 and the front inner cover 33 by the front side cover 32 via the support bracket 71 and the flasher cover 81 is disposed across the front side cover 32 and the front inner cover 33. The joint between the front side cover 32 and the front inner cover 33 can be used to form easily a portion through which the flasher stay 61 is passed. Further, the area around the flasher stay 61 is covered with the flasher cover 81 for improved appearance.

Second Embodiment

A second embodiment of the present invention will be described below with reference to FIGS. 11 through 15.

The second embodiment of the present invention differs from the first embodiment of the present invention mainly in that a flasher stay 161 and a support bracket 171 are used in place of the flasher stay 61 and the support bracket 71. Like or corresponding parts are identified by the same reference symbols as those used for the first embodiment of the present invention and descriptions for those parts will be omitted.

Figure 11:
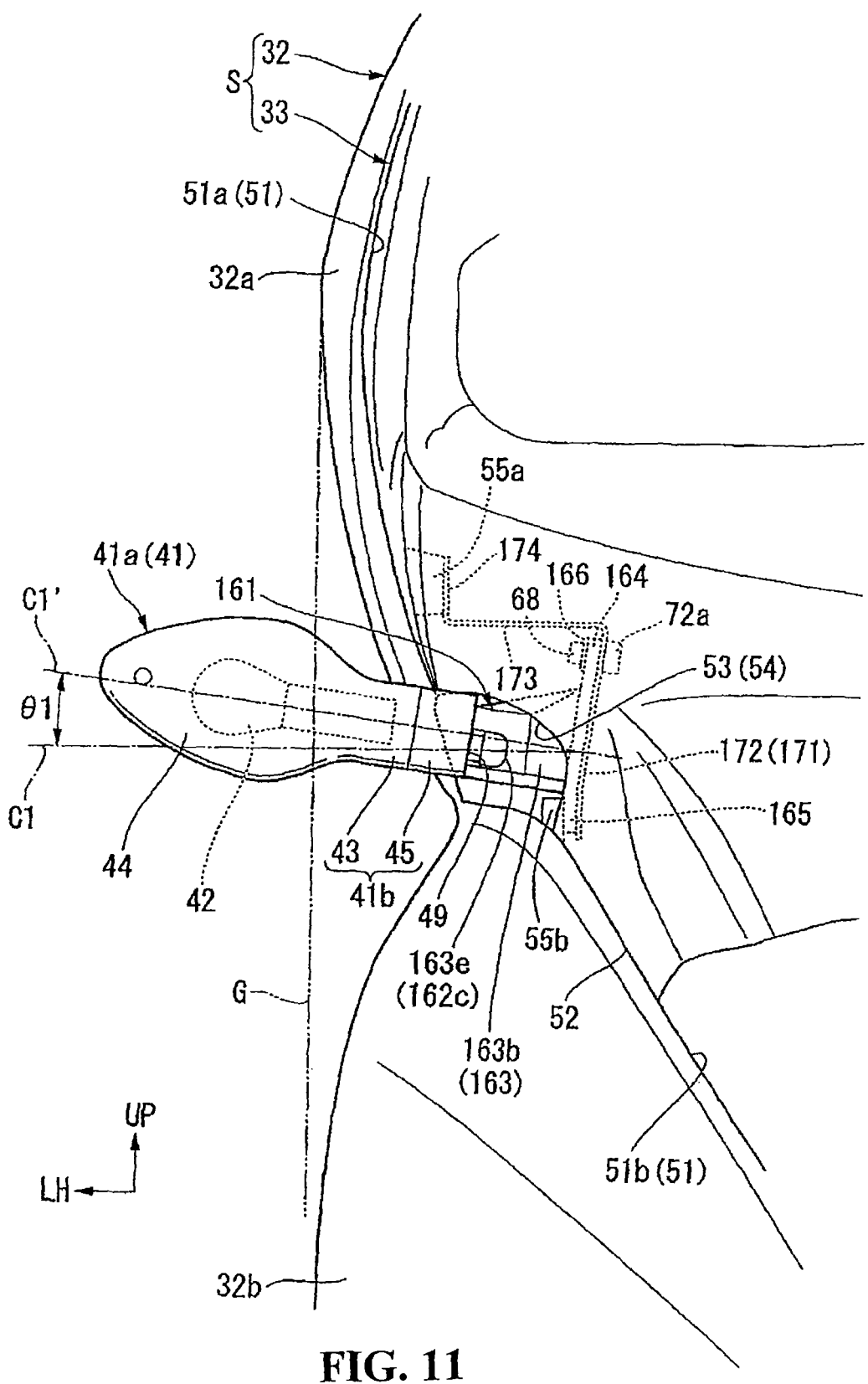
FIG. 11 is a rear elevational view showing a second embodiment of the present invention.
Figure 12:
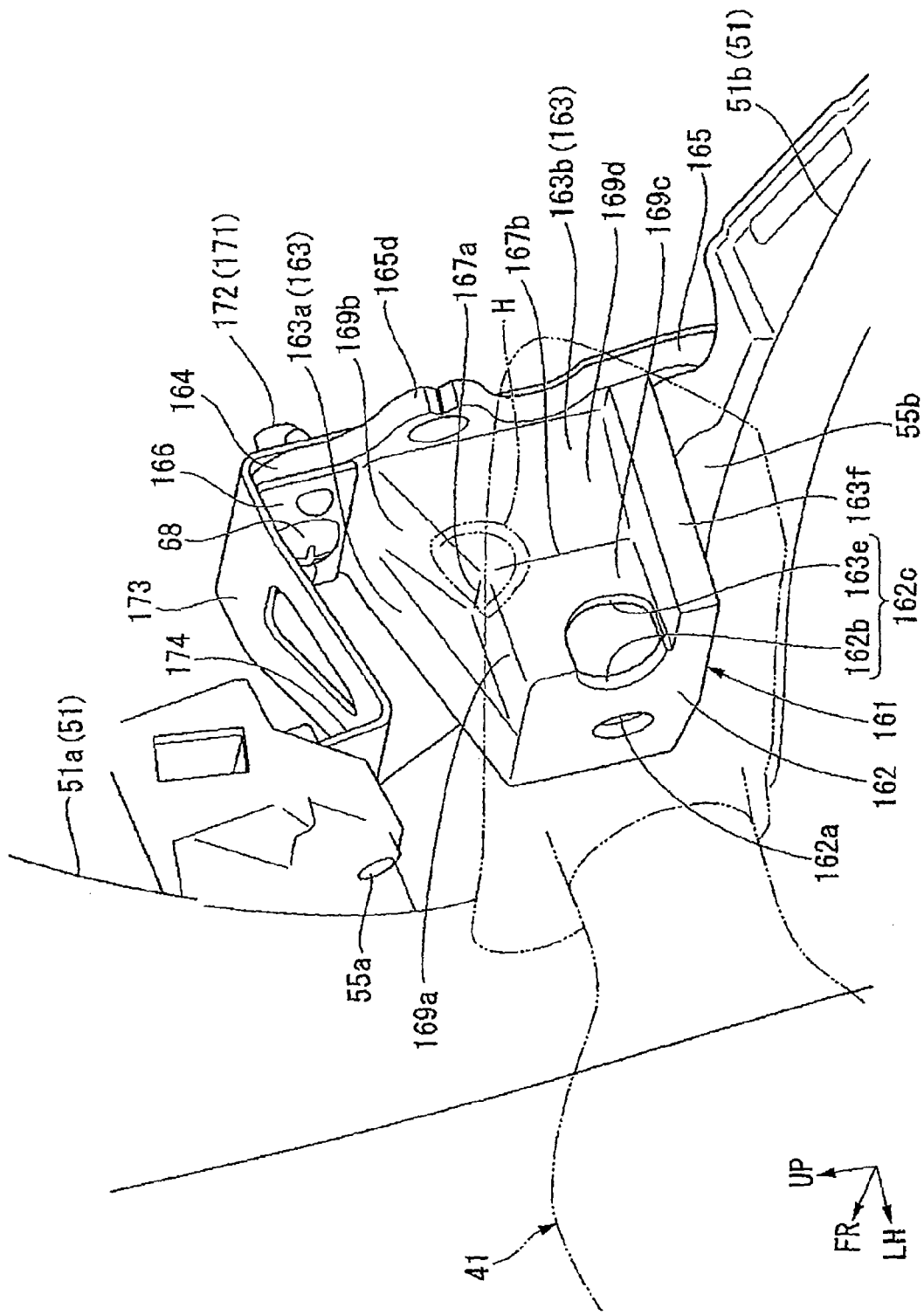
FIG. 12 is a perspective view showing the second embodiment of the present invention.
Figure 13:
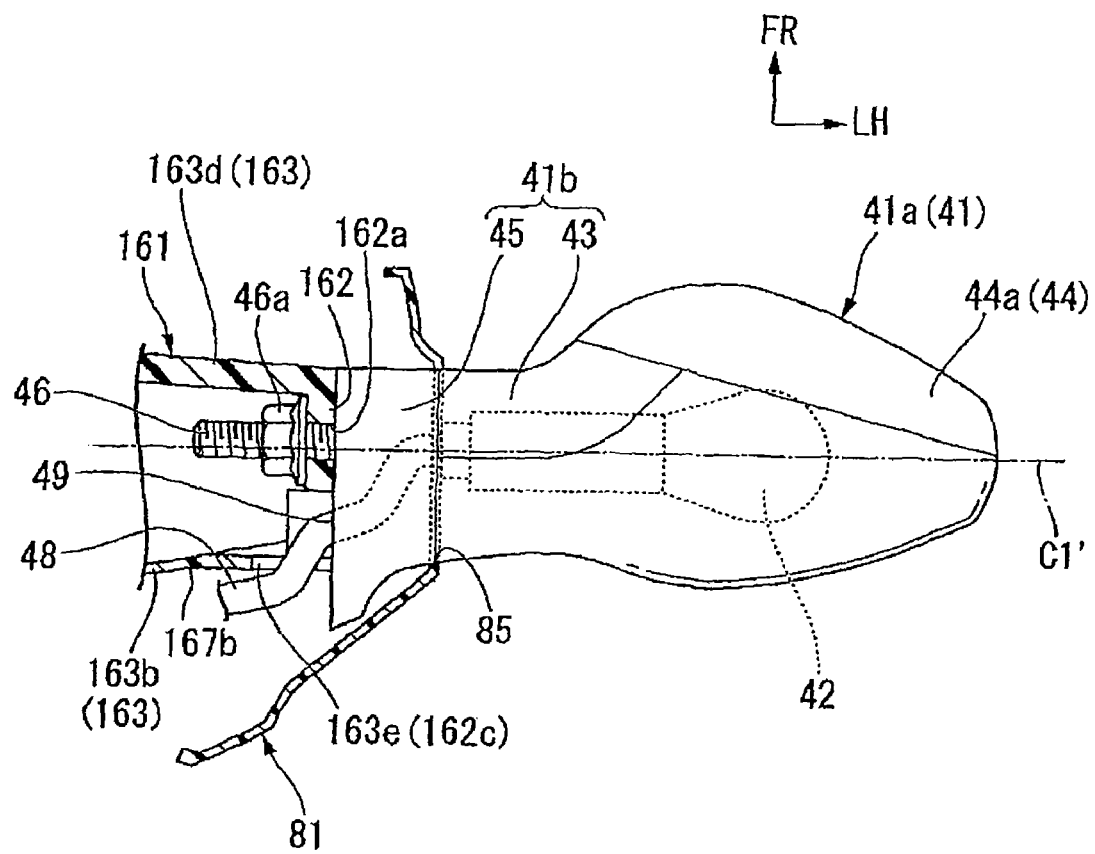
FIG. 13 is a bottom plan view showing the second embodiment of the present invention.

Referring to FIGS. 11 through 13, the flasher stay 161 that is continuous with a shaft portion 41b of a front flasher 41 reaches into the inside of the cowling 30 through the opening 54 in the cowling 30. The flasher stay 161 has a leading end fixed onto the support bracket 171. Meanwhile, the shaft portion 41b has an intermediate portion that penetrates through the flasher cover 81 in a condition of being in alignment therewith. This results in the front flasher 41 being supported at the front portion on the outside of the cowling 30 via the flasher stay 161, the support bracket 171, and the flasher cover 81. In FIGS. 11 and 13, reference symbol C1' denotes an axis extending in a direction in which the shaft portion 41b and the flasher stay 161 extend. Whereas the above-described axis C1 extends in parallel with the lateral direction (vehicle width direction), the axis C1' is inclined at an angle θ1 so as to be disposed more upwardly at axially outer sides (outer sides in the vehicle width direction).

An outside surface of a bottom wall portion 162 that is an outside end portion in the vehicle width direction of the flasher stay 161 abuts on an end face 49 of the shaft portion 41b of the front flasher 41. At this time, the threaded shaft 46 is passed through the bottom wall portion 162 and a nut 46a is threadedly screwed and tightened on the threaded shaft 46 from the inside in the vehicle width direction of the bottom wall portion 162 (from the inside of the flasher stay 161). This results in the flasher stay 161 being integrally connected to the leading end side of the shaft portion 41b.

Figure 14:
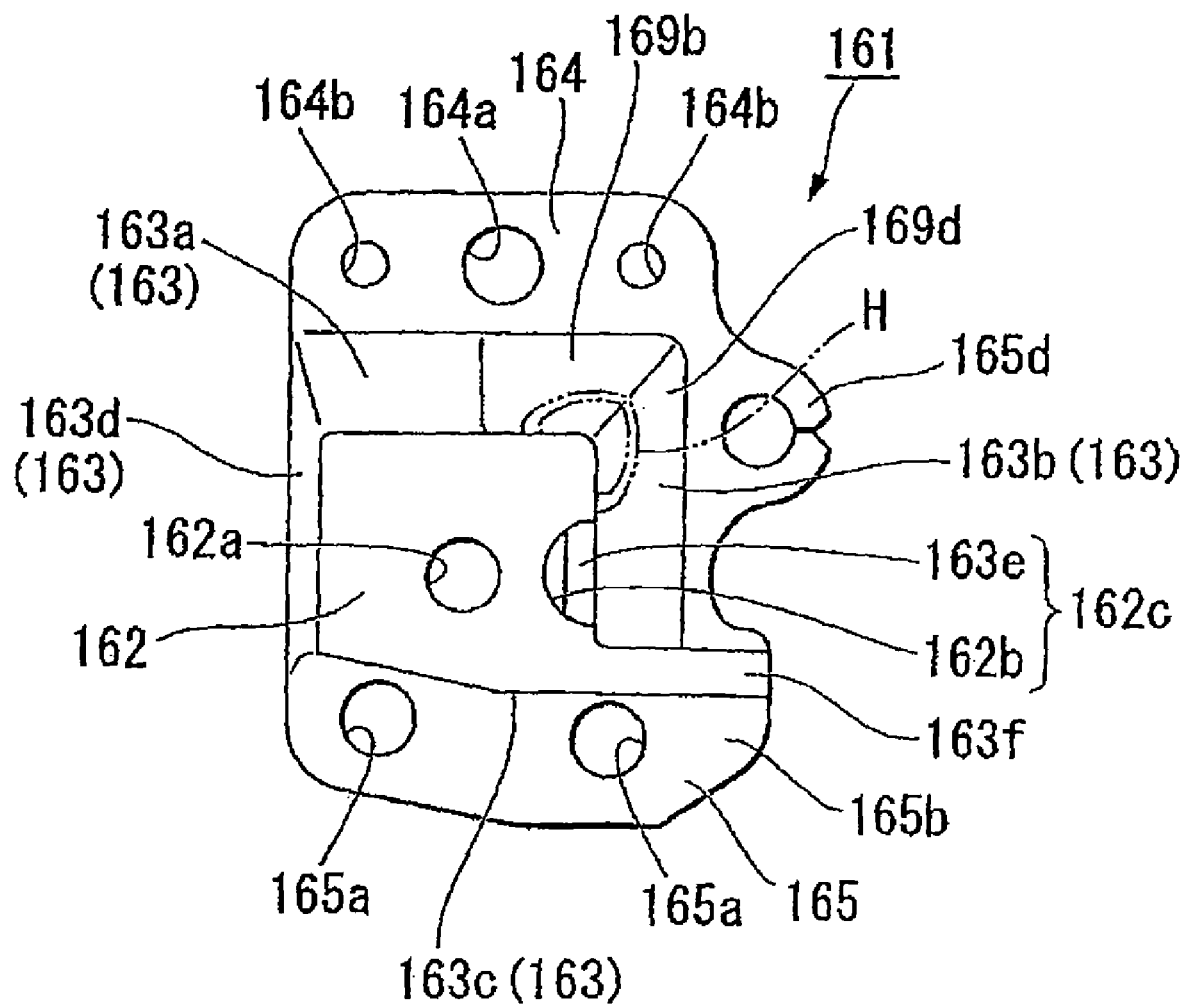
FIG. 14 is a side elevational view showing the second embodiment of the present invention.
Figure 15:
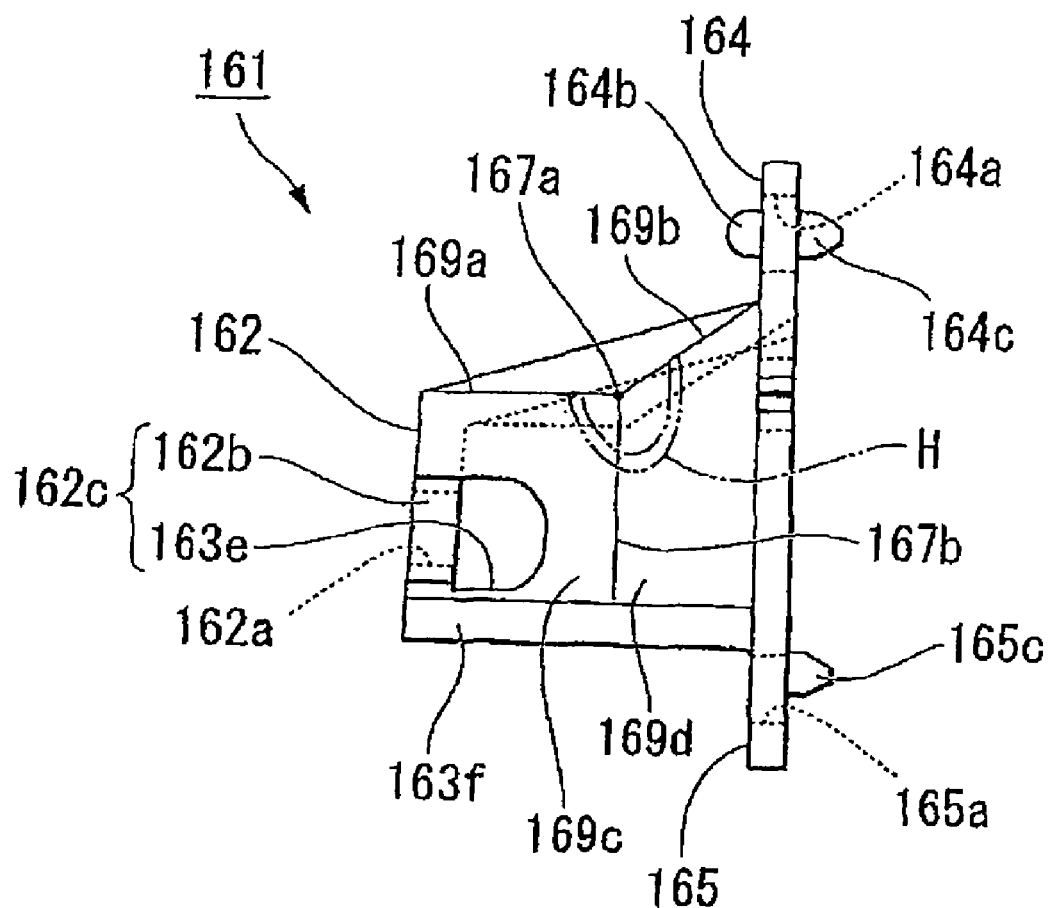
FIG. 15 is a rear elevational view showing the second embodiment of the present invention.

Referring also to FIGS. 14 and 15, the flasher stay 161 is a one-piece molding formed from an elastic material, for example, rubber. The flasher stay 161 is formed into a cup shape that opens toward the inside in the vehicle width direction (a tube shape with a bottom). Specifically, the flasher stay 161 is structured to include the bottom wall portion 162 and a peripheral wall portion 163. More specifically, the bottom wall portion 162 is a planar surface extending substantially orthogonally to the axis C1'. The peripheral wall portion 163 extends inwardly in the vehicle width direction from an outer peripheral edge of the bottom wall portion 162, while widening a cross-sectional area (opening) of the flasher stay 161 (widening an outline and an internal space). Except for a part thereof, the flasher stay 161 generally has a substantially uniform wall thickness. The flasher stay 161 differs mainly from the flasher stay 61 in that the flasher stay 161 has bent portions 167a, 167b protruding inwardly thereof at an upper portion and a rear portion, respectively, of the peripheral wall portion 163.

The bottom wall portion 162 is substantially rectangular in a front view thereof (view on an arrow along the axis C1'). An upper wall portion 163a, a rear wall portion 163b, a lower wall portion 163c, and a front wall portion 163d in the peripheral wall portion 163 extend toward the inside in the vehicle width direction from respective sides of the bottom wall portion 162. Specifically, the peripheral wall portion 163 is formed into a tube having substantially a polygonal shape in cross section.

The bottom wall portion 162 includes a center insertion hole 162a and a cutaway 162b made therein. Specifically, the center insertion hole 162a is made substantially at a central portion of the bottom wall portion 162, through which the threaded shaft 46 is to be passed through. The cutaway 162b, made at a rear end portion of the bottom wall portion 162, has a semi-circular shape in a front view, through which the flasher cable 48 can be pulled out to an outside of the flasher stay 161. The cutaway 162b is joined to a cutaway 163e formed on the outside of the rear wall portion 163b in the peripheral wall portion 163, the cutaway 162b and the cutaway 163e forming a cutaway portion 162c at a rear portion on the outside of the flasher stay 161. The flasher cable 48 is routed on the outside of the flasher stay 161 through the cutaway portion 162c.

The upper wall portion 163a includes a front half portion and a rear half portion. Whereas the front half portion is a planar surface inclined relative to the axis C1', the rear half portion is bent to form a valley shape concaving inwardly of the flasher stay 161. Similarly, the rear wall portion 163b is bent to form a valley shape concaving inwardly of the flasher stay 161. Each of a valley line of the rear half portion of the upper wall portion 163a and a valley line of the rear wall portion 163b is orthogonal to the axis C1' and is continuous with each other.

The valley lines of the upper wall portion 163a and the rear wall portion 163b will hereinafter be referred to as the bent portions 167a, 167b, respectively. In addition, a portion of the upper wall portion 163a outside the bent portion 167a in the vehicle width direction will be referred to as an upper outside portion 169a and a portion of the upper wall portion 163a inside the bent portion 167a in the vehicle width direction will be referred to as an upper inside portion 169b. Further, a portion of the rear wall portion 163b outside the bent portion 167b in the vehicle width direction will be referred to as a rear outside portion 169c and a portion of the rear wall portion 163b inside the bent portion 167b in the vehicle width direction will be referred to as a rear inside portion 169d.

The upper wall portion 163a and the rear wall portion 163b have an opening rate (rate of change in the opening (cross-sectional area) relative to the change in the direction of the axis C1') of the flasher stay 161 changed with the bent portion 167a and the bent portion 167b as the boundary. Specifically, whereas the upper outside portion 169a and the rear outside portion 169c are each disposed to extend substantially in parallel with the axis C1', the upper inside portion 169b and the rear inside portion 169d are each disposed to be inclined largely relative to the axis C1'.

The lower wall portion 163c and the front wall portion 163d are each disposed to extend substantially in parallel with the axis C1' (inclined less relative to the axis C1'). Additionally, the front half portion of the upper wall portion 163a is inclined relative to the axis C1' less than the upper inside portion 169b and the rear inside portion 169d is inclined relative to the axis C1'. The flasher stay 161 further includes a reinforcement rib 163f disposed at a lower edge portion on the rear side of the rear wall portion 163b so as to extend rearwardly from the lower wall portion 163c.

The flasher stay 161 further includes upper and lower fixing flanges 164, 165 disposed at upper and lower ends on the leading end of the peripheral wall portion 163. The upper and lower fixing flanges 164, 165 are substantially orthogonal to the axis C1'.

The upper fixing flange 164 is connected to an upper portion of the support bracket 171 by tightening the bolt 68 inserted from the outside in the vehicle width direction to the upper portion of the support bracket 171. The upper fixing flange 164 includes an insertion hole 164a and a pair of front and rear protrusions 164b. Specifically, the insertion hole 164a is for the bolt 68 and the pair of front and rear protrusions 164b holds a washer member 166 in place, thus forming a seat surface of the bolt 68. The upper fixing flange 164 also includes an upper inner protrusion 164c disposed on the inside surface of the upper fixing flange 164. The upper inner protrusion 164c is used for positioning the flasher stay 161 relative to the upper portion of the support bracket 171.

The lower fixing flange 165 abuts on the inside in the vehicle width direction of the lower fixing portion 55b disposed at the lower outside edge portion 52b of the front side covers 32 at a lower portion of the opening 54. Further, a lower portion of the support bracket 171 abuts on the inside in the vehicle width direction of the lower fixing flange 165. The lower fixing flange 165 is connected to the lower fixing portion 55b by a pair of front and rear fixing means, for example, tapping screws clamped between the lower portion of the support bracket 171 and the lower fixing portion 55b. Note that the lower fixing flange 165 includes insertion holes 165a used for the fixing means.

In addition, the lower fixing flange 165 includes a rearward extension portion 165b disposed at a rear end portion thereof. The above-described reinforcement rib 163f has an inside end thereof connected to an outside surface of the rearward extension portion 165b. The lower wall portion 163c includes a flasher cable holder portion 165d disposed upwardly of the rearward extension portion 165b. The flasher cable holder portion 165d is disposed at a leading end on the rearward side of the rear wall portion 163b, formed into a C shape as viewed in an axial direction. The lower fixing flange 165 includes a lower inner protrusion 165c disposed on the inside surface of the lower fixing flange 165. The lower inner protrusion 165c is used for positioning the flasher stay 161 relative to the lower portion of the support bracket 171.

The support bracket 171 is formed by, for example, bending a steel sheet to include integrally a support plate portion 172, an upper wall portion 173, and an upper fixing flange 174. Specifically, the support plate portion 172 is a planar shape that is inclined downwardly relative to a plane orthogonal to the lateral direction. The upper wall portion 173 extends from an upper edge of the support plate portion 172 toward the outside in the vehicle width direction. The upper fixing flange 174 extends upwardly from an outside edge of the upper wall portion 173. The support bracket 171 differs mainly from the support bracket 71 in that the support plate portion 172 is inclined relative to the plane orthogonal to the lateral direction. The axis C1' of the shaft portion 41b and the flasher stay 161 is inclined relative to the lateral direction so as to be substantially orthogonal to the support plate portion 172.

The support plate portion 172 includes a nut 72a and a starting hole thereof disposed at an upper portion thereof, with which the bolt 68 is to be threadedly screwed. The support plate portion 172 also includes an engagement hole (not shown) disposed at the upper portion thereof for, the upper inner protrusion 164c. The support plate portion 172 further includes an insertion hole (not shown) and an engagement hole (not shown) made at a lower portion thereof. The insertion hole is used for fixing means relative to the lower fixing portion 55b and the engagement hole is for the lower inner protrusion 165c.

The upper fixing flange 174 (the upper portion of the support bracket 171) is connected to the upper fixing portion 55a disposed at the upper outside edge portion 51a of the front side cover 32 at an upper portion in the opening 54 using a single fixing means, such as a tapping screw. The support plate portion 172 has the lower portion thereof connected to the lower fixing portion 55b of the front side cover 32 by a pair of front and rear fixing means, for example, tapping screws for clamping the lower fixing flange 165 of the flasher stay 161 as described earlier.

The support plate portion 172 has the upper portion that is inclined relatively downwardly relative to the plane orthogonal to the lateral direction. The support plate portion 172 has, on the other hand, the lower portion that is mildly bent relative to the upper portion so as to be substantially orthogonal to the lateral direction. The lower fixing flange 165 of the flasher stay 161 is elastically deformed so as to be aligned with the lower portion of the support plate portion 172. The lower fixing flange 165 is clamped between the lower portion of the support plate portion 172 and the lower fixing portion 55b.

The opening 54 and the flasher stay 161 are disposed inside in the vehicle width direction of an outermost position of the front side cover 32 (leg shield S) (specifically, a line G in FIG. 3). This helps make the opening 54 less noticeable and allows the flasher stay 161 to be elastically deformed when an external force is applied to the front flasher 41.

If an external force is applied to the front flasher 41 from, for example, the outside in the vehicle width direction toward the inside in the vehicle width direction (an external force from an axial outside), the shaft portion 41b of the front flasher 41 and the axis C1' of the flasher stay 161 is inclined relative to the vehicle width direction. Additionally, the bent portions 167a, 167b of the upper wall portion 163a and the rear wall portion 163b, respectively, of the flasher stay 161 cause the flasher stay 161 to tend to buckle so that the flasher stay 161 is bent obliquely upwardly toward the rear, which allows the external force to escape effectively. This also holds true when an external force toward obliquely upwardly toward the rear, which tends to be applied to the front flasher 41, is applied.

As such, forming the elastic tubular flasher stay 161 continuous with the shaft portion 41b of the front flasher 41 substantially into a taper and having the bent portions 167a, 167b provided in the upper wall portion 163a and the rear wall portion 163b, respectively, of the flasher stay 161 allow each of the abovementioned external forces that tend to be applied to the front flasher 41 of the motorcycle 1 to escape effectively.

To make the flasher stay 161 buckle even more easily, an area around of each of the bent portions 167a, 167b (an area H shown by the dash-double-dot line in FIGS. 12, 14, and 15) may be cut out across the upper wall portion 163a and the rear wall portion 163b.

Figure 16:
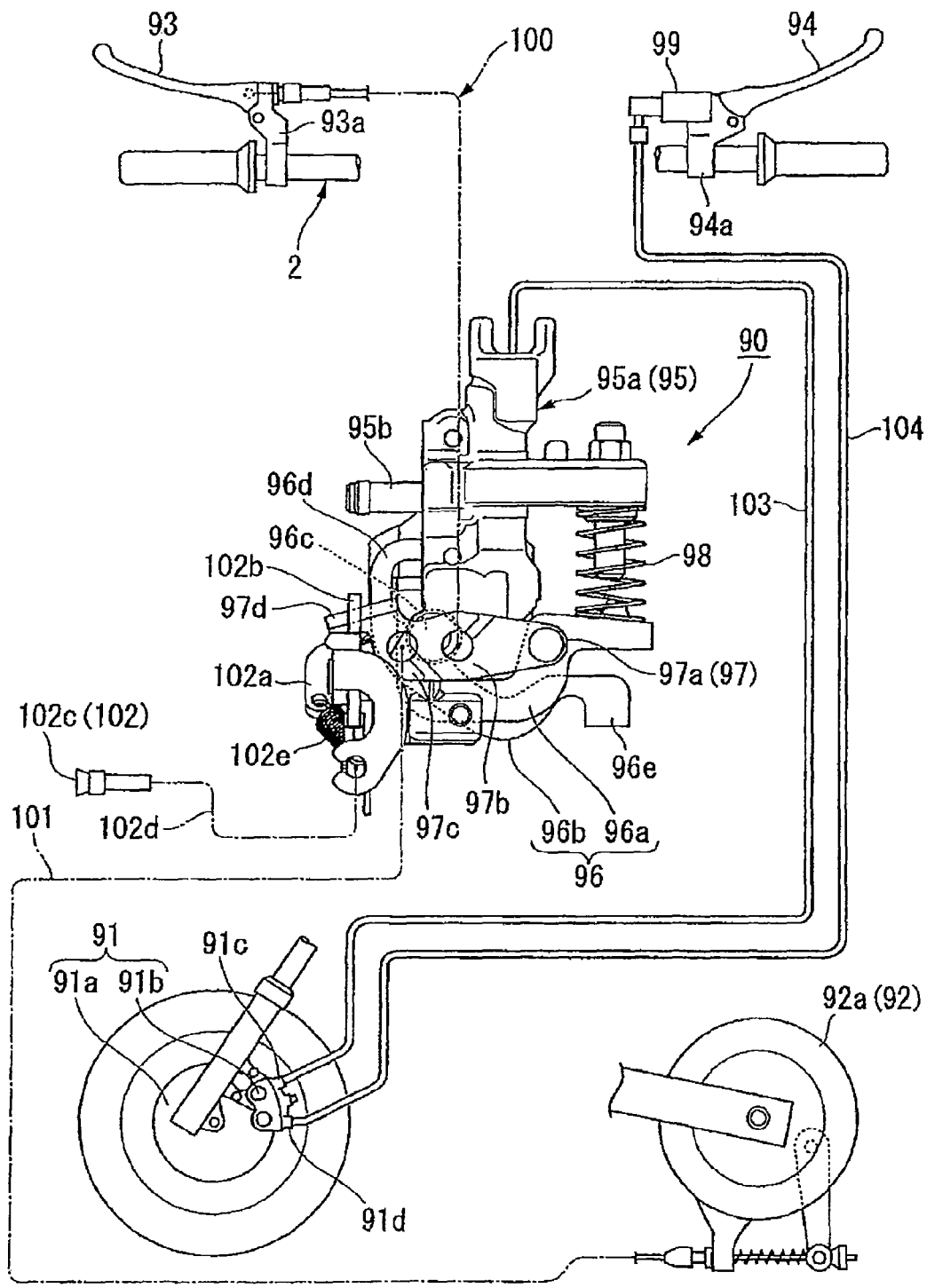
FIG. 16 is an illustration showing arrangements of a front-and-rear operatively connected brake system of the motorcycle.

Referring now to FIG. 16, the motorcycle 1 includes a front-and-rear operatively connected brake system that operatively connects a hydraulic brake (front wheel brake) 91 and a mechanical brake (rear wheel brake) 92 with each other.

An operatively connected brake device 90 in the front-and-rear operatively connected brake system includes the hydraulic brake 91 disposed at the front wheel, the mechanical brake 92 disposed at the rear wheel, an operatively connected brake operator 93, an independent brake operator 94, an master cylinder unit 95, a handlebar side master cylinder 99, operatively connected brake operating force transmission means 100, mechanical brake operating force transmission means 101, brake lock means 102, a unit side hydraulic pipe 103, and a handlebar side hydraulic pipe 104. More specifically, the operatively connected brake operator 93 disposed on the left-hand side of the handlebar 2 is used to operate each brake. The independent brake operator 94 disposed on the right-hand side of the handlebar 2 is used to operate only the hydraulic brake 91. The master cylinder unit 95 is interposed between the brake operators 93, 94 and the brakes 91, 92 to operate the brakes 91, 92. The handlebar side master cylinder 99 disposed on the right-hand side of the handlebar 2 operates only the hydraulic brake 91 through the operation of the independent brake operator 94. The operatively connected brake operating force transmission means 100 has a first end connected to the operatively connected brake operator 93 and a second end connected to the master cylinder unit 95. The mechanical brake operating force transmission means 101 has a first end connected to the mechanical brake 92 and a second end connected to master cylinder unit 95. The brake lock means 102 retains the mechanical brake 92 in an operative state independently of the operatively connected brake operator 93. The unit side hydraulic pipe 103 connects between the master cylinder unit 95 and the hydraulic brake 91. The handlebar side hydraulic pipe 104 connects between the handlebar side master cylinder 99 and the hydraulic brake 91.

The hydraulic brake 91 is a disc brake, including a brake disc 91a that rotates integrally with a front wheel 3 and a brake caliper 91b that clampingly holds the brake disc 91a. The brake caliper 91b includes a first connection port 91c to which the unit side hydraulic pipe 103 is connected and a second connection port 91d to which the handlebar side hydraulic pipe 104 is connected. The connection ports 91c, 91d form part of mutually independent hydraulic systems.

The mechanical brake 92, on the other hand, is a drum brake, including a brake drum 92a that rotates integrally with the rear wheel 4 and a brake shoe (not shown) that is pressed up against an inner periphery of the brake drum 92a.

Each of the operatively connected brake operator 93 and the independent brake operator 94 is a brake lever rotatably supported by a corresponding one of lever holders 93a, 94a fixed to the left and right of the handlebar 2.

The master cylinder unit 95 includes a hydraulic cylinder block 95a, a lever mechanism 96, an equalizer 97, and a delay spring 98. Specifically, the hydraulic cylinder block 95a constitutes a main body of the master cylinder unit 95. The lever mechanism 96 drives a piston (not shown) in the hydraulic cylinder block 95a. The equalizer 97 is connected to the lever mechanism 96 and enables operation of each brake according to the operation of the operatively connected brake operator 93. The delay spring 98 is interposed between the hydraulic cylinder block 95a and the lever mechanism 96 to retard the motion of the lever mechanism 96 and return the lever mechanism 96 to an initial condition. In FIG. 16, reference symbol 95b denotes a hose connection portion to which a hose 105a extending from a reservoir tank 105 (see FIG. 18) is connected.

The lever mechanism 96 includes an operatively connected rotation lever 96a and a knocker 96b. Specifically, the operatively connected rotation lever 96a is rotatably supported by the hydraulic cylinder block 95a. The knocker 96b is rotatably supported by the hydraulic cylinder block 95a coaxially with the operatively connected rotation lever 96a. In FIG. 16, reference symbol 96c denotes a rotation shaft of the operatively connected rotation lever 96a and the knocker 96b.

The delay spring 98 applies an urging force to a first end side of the operatively connected rotation lever 96a. The operatively connected rotation lever 96a is capable of pressing the piston in the hydraulic cylinder block 95a via the knocker 96b. Receiving the urging force of the delay spring 98, the operatively connected rotation lever 96a is reset to an initial condition (a condition before pressing the piston). In FIG. 16, reference symbol 96d denotes a rotation stopper of the knocker 96b that makes a sliding contact with a side surface of the hydraulic cylinder block 95a; and reference symbol 96e denotes a knocker operation portion that enables operation of only the knocker 96b, independently of the operatively connected rotation lever 96a, to thereby enable, for example, an operation of bleeding the hydraulic cylinder block 95a of air.

The equalizer 97 has a first end portion 97a thereof rotatably supported by the operatively connected rotation lever 96a. The equalizer 97 includes an operatively connected brake connection portion 97b, a mechanical brake connection portion 97c, and a brake lock engagement portion 97d, disposed in sequence from the first end portion 97a toward a second end side. Specifically, the operatively connected brake connection portion 97b connects the operatively connected brake operating force transmission means 100. The mechanical brake connection portion 97c connects the mechanical brake operating force transmission means 101. The brake lock engagement portion 97d engages a lock lever 102b of the brake lock means 102.

When the operatively connected brake operator 93 is operated, an operation force thereof is transmitted to the equalizer 97 via the operatively connected brake operating force transmission means 100 and the equalizer 97 is rotated about the first end portion 97a, so that the mechanical brake 92 is operated via the mechanical brake operating force transmission means 101.

When the operating force of the operatively connected brake operator 93 is then made greater, the operating force of the mechanical brake 92 is made greater; at the same time, the equalizer 97 operates the operatively connected rotation lever 96a against the urging force of the delay spring 98, so that the operatively connected rotation lever 96a operates the hydraulic cylinder block 95a via the knocker 96b. The hydraulic pressure generated at this time is transmitted to the brake caliper 91b via the unit side hydraulic pipe 103, which operates the hydraulic brake 91 in operative association with the mechanical brake 92.

When the independent brake operator 94 is operated, on the other hand, the handlebar side master cylinder 99 disposed integrally with the lever holder 94a is operated to generate a hydraulic pressure. The hydraulic pressure is then transmitted to the brake caliper 91b via the handlebar side hydraulic pipe 104, which operates the hydraulic brake 91 independently of the mechanical brake 92.

Figure 17:
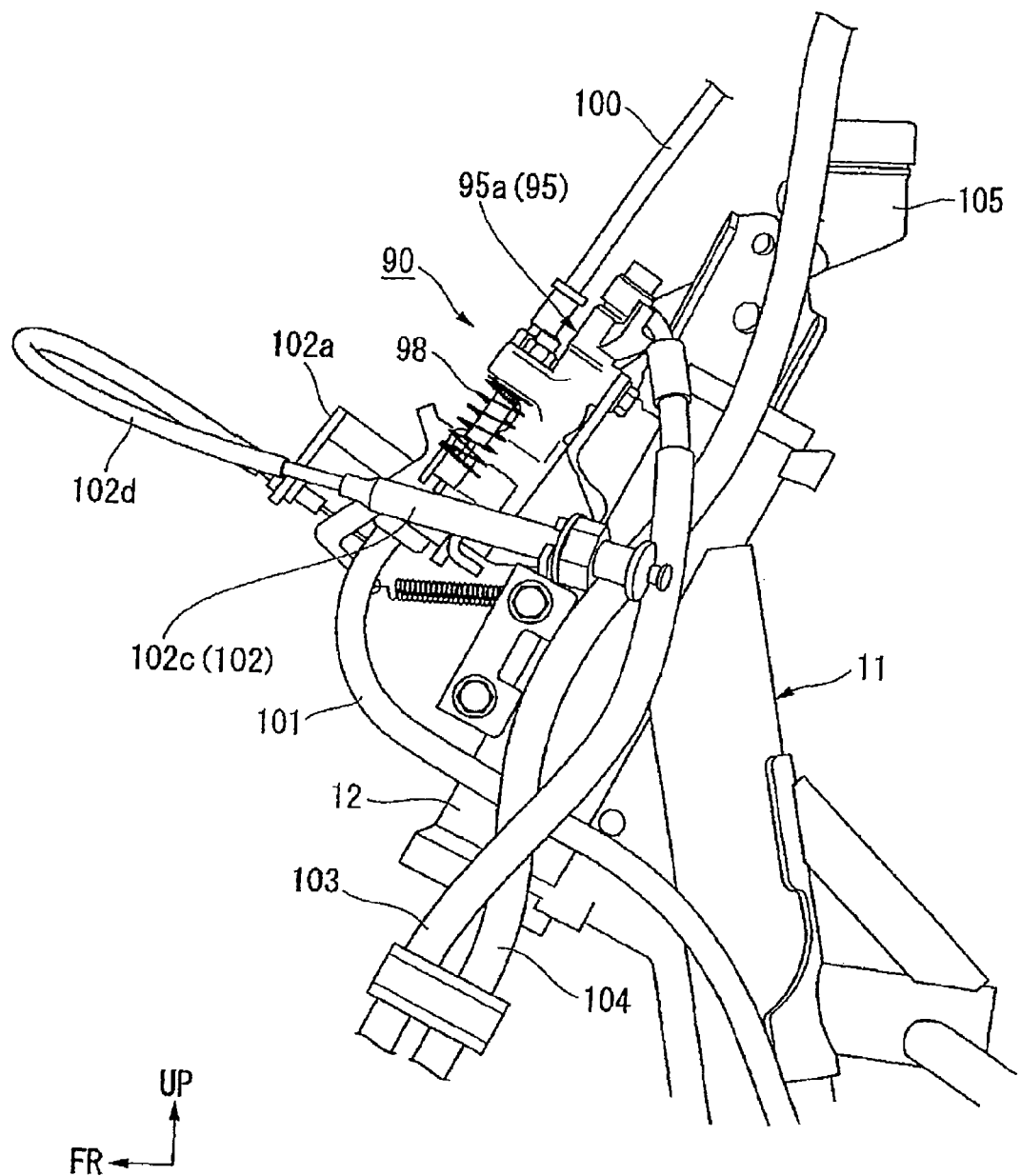
FIG. 17 is a left side elevational view showing an area around an operatively connected brake device in the front-and-rear operatively connected brake system.
Figure 18:
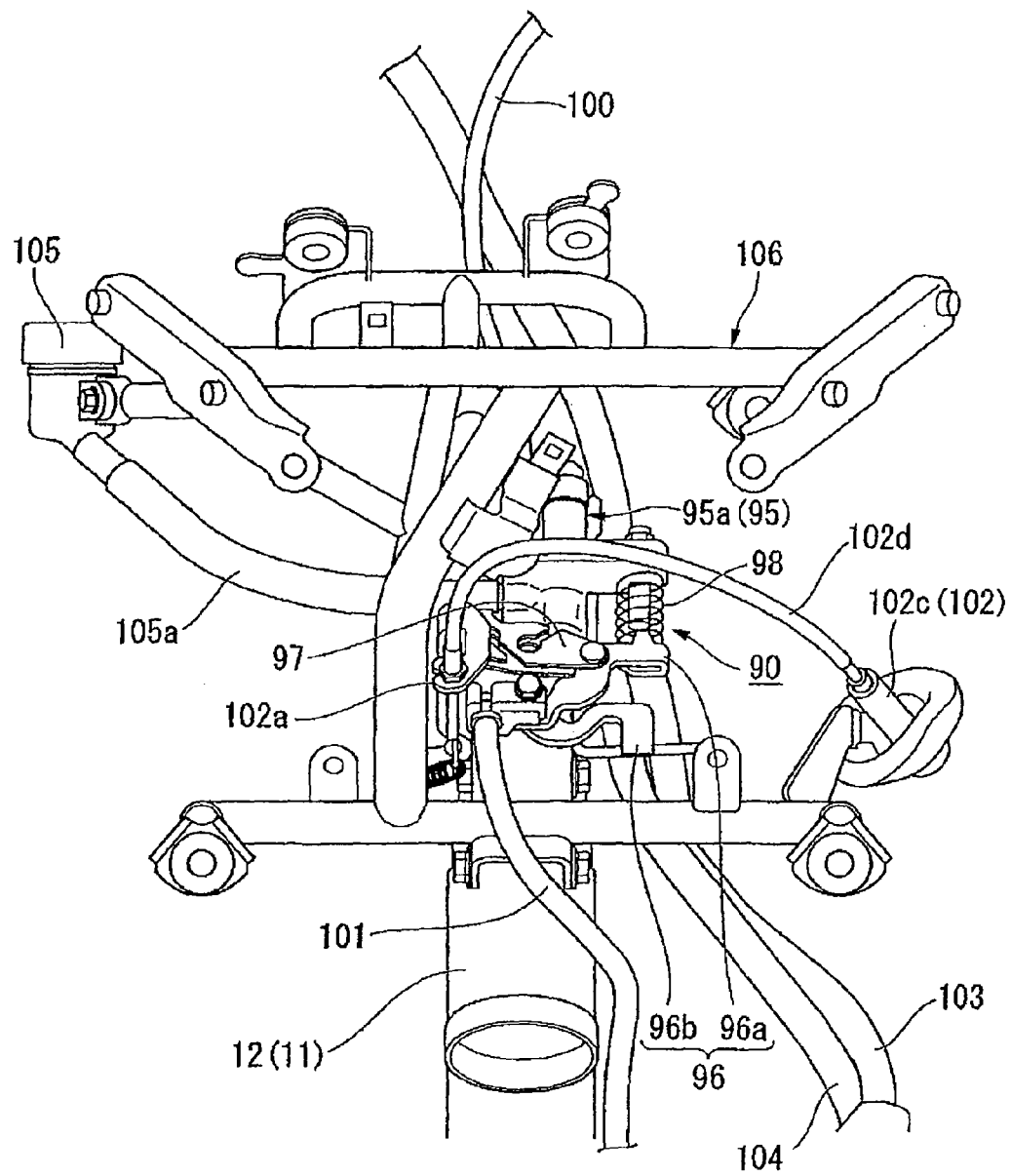
FIG. 18 is a front elevational view showing the area around the operatively connected brake device.

Referring now to FIGS. 17 and 18, the operatively connected brake device 90 is disposed inside the cowling 30 at an upper portion at the front side of the head pipe 12. The operatively connected brake device 90 is appropriately supported by the head pipe 12 and, for example, a cowl stay 106 that is supported by the head pipe 12.

Figure 19:
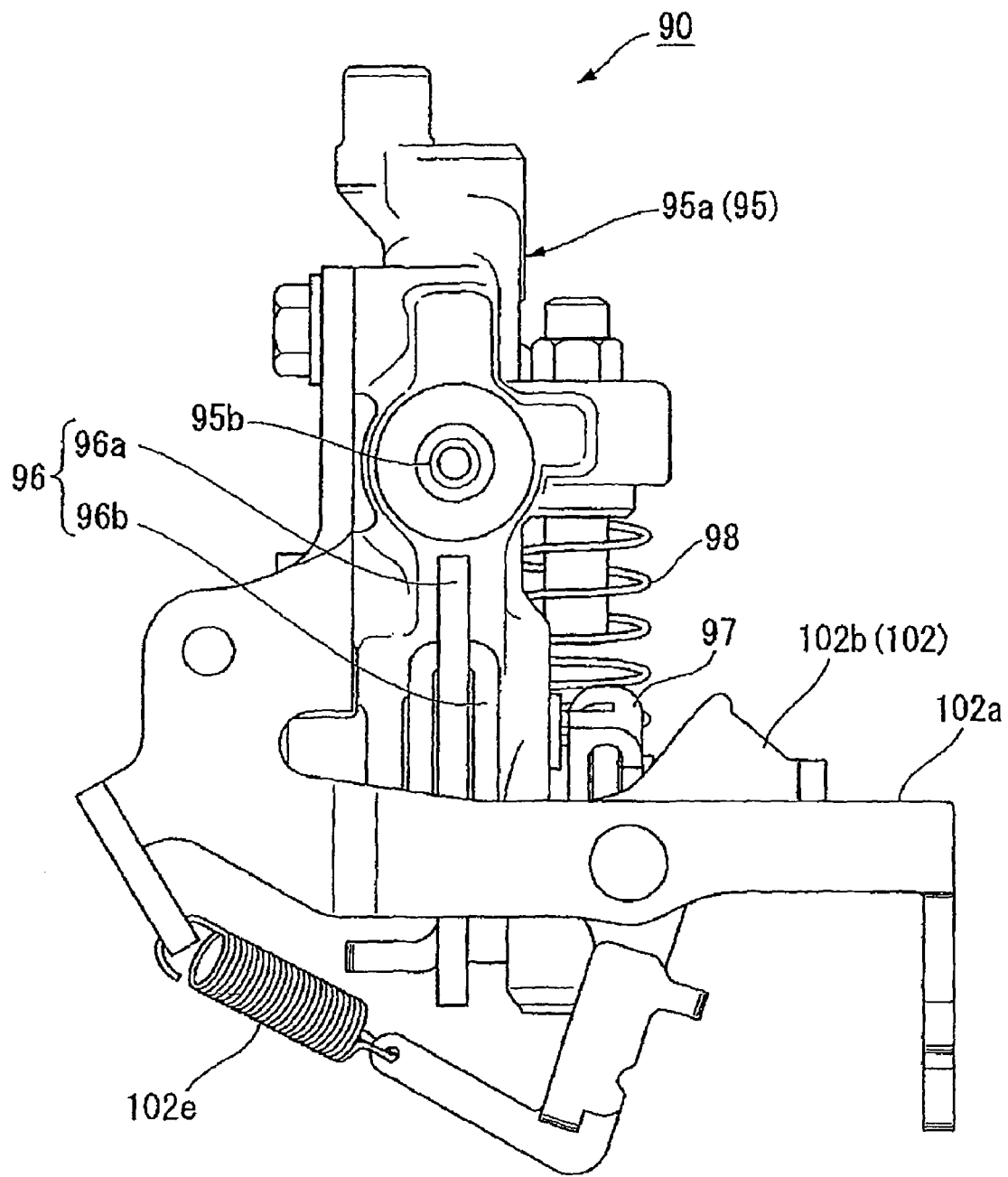
FIG. 19 is a right side elevational view showing the operatively connected brake device.

Referring to FIGS. 16 and 19, the brake lock means 102 includes a lock lever holder 102a, the lock lever 102b, and brake lock operating force transmission means 102d. Specifically, the lock lever holder 102a is fixed to the hydraulic cylinder block 95a. The lock lever 102b is rotatably supported by the lock lever holder 102a. The brake lock operating force transmission means 102d has a first end connected to the lock lever 102b and a second end connected to a brake lock operator 102c.

Figure 20:
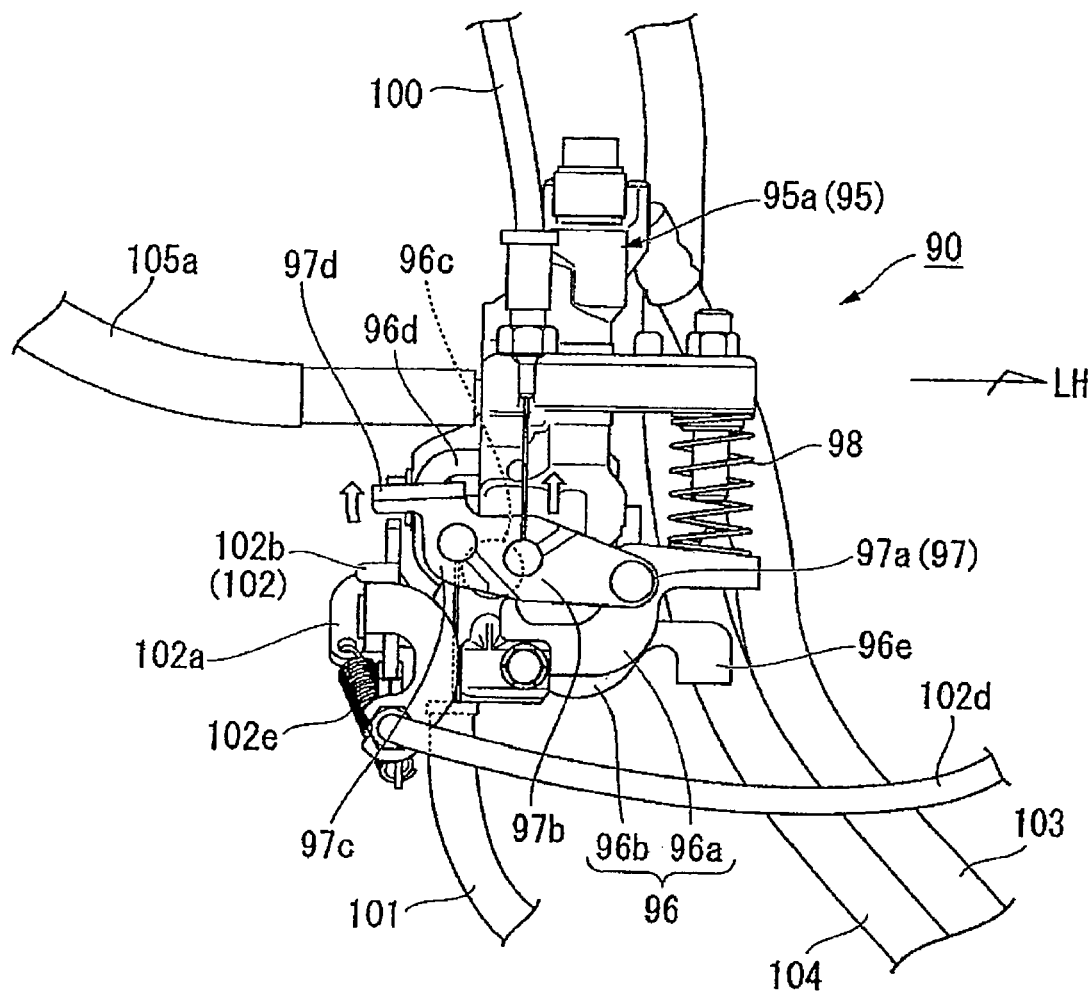
FIG. 20 is a front elevational view showing a first operation state of the operatively connected brake device.
Figure 21:
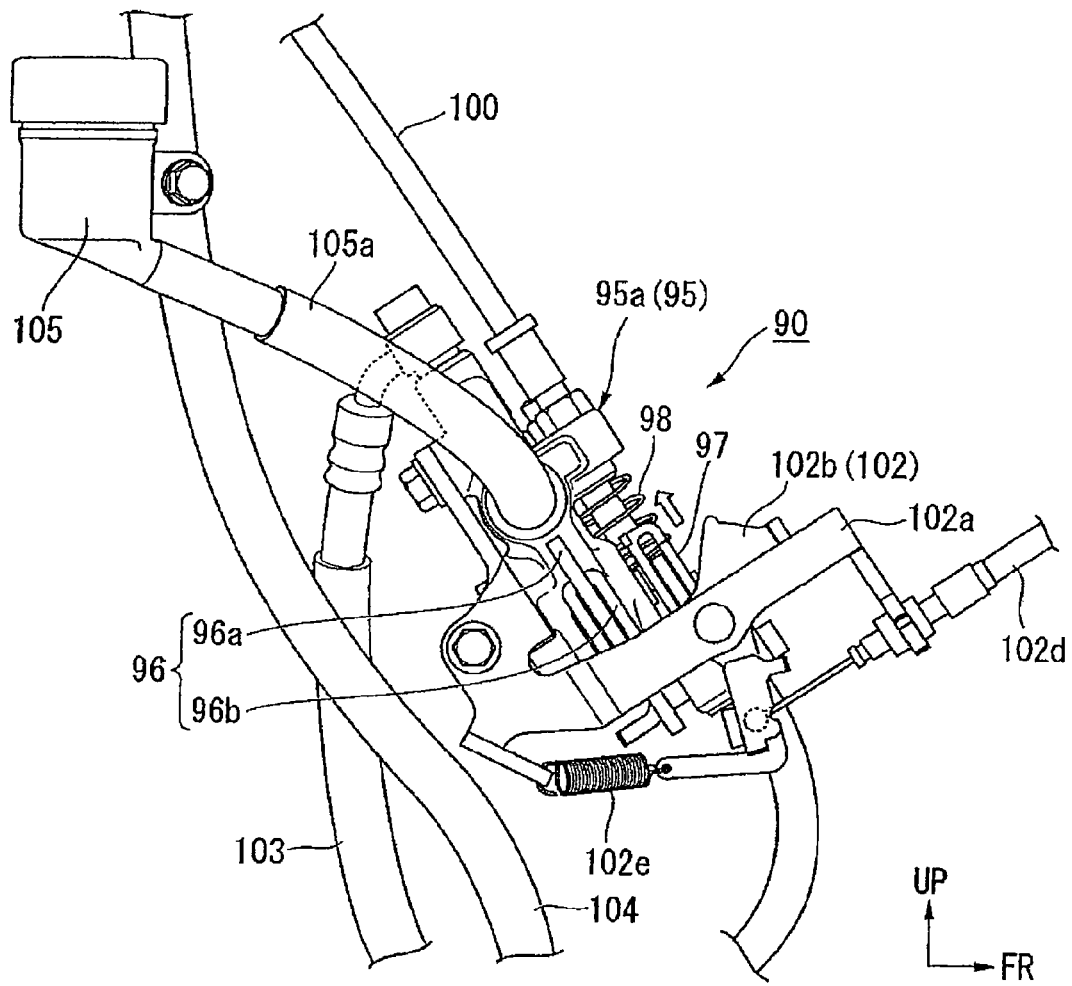
FIG. 21 is a right side elevational view showing the first operation state of the operatively connected brake device shown in FIG. 20.
Figure 22:
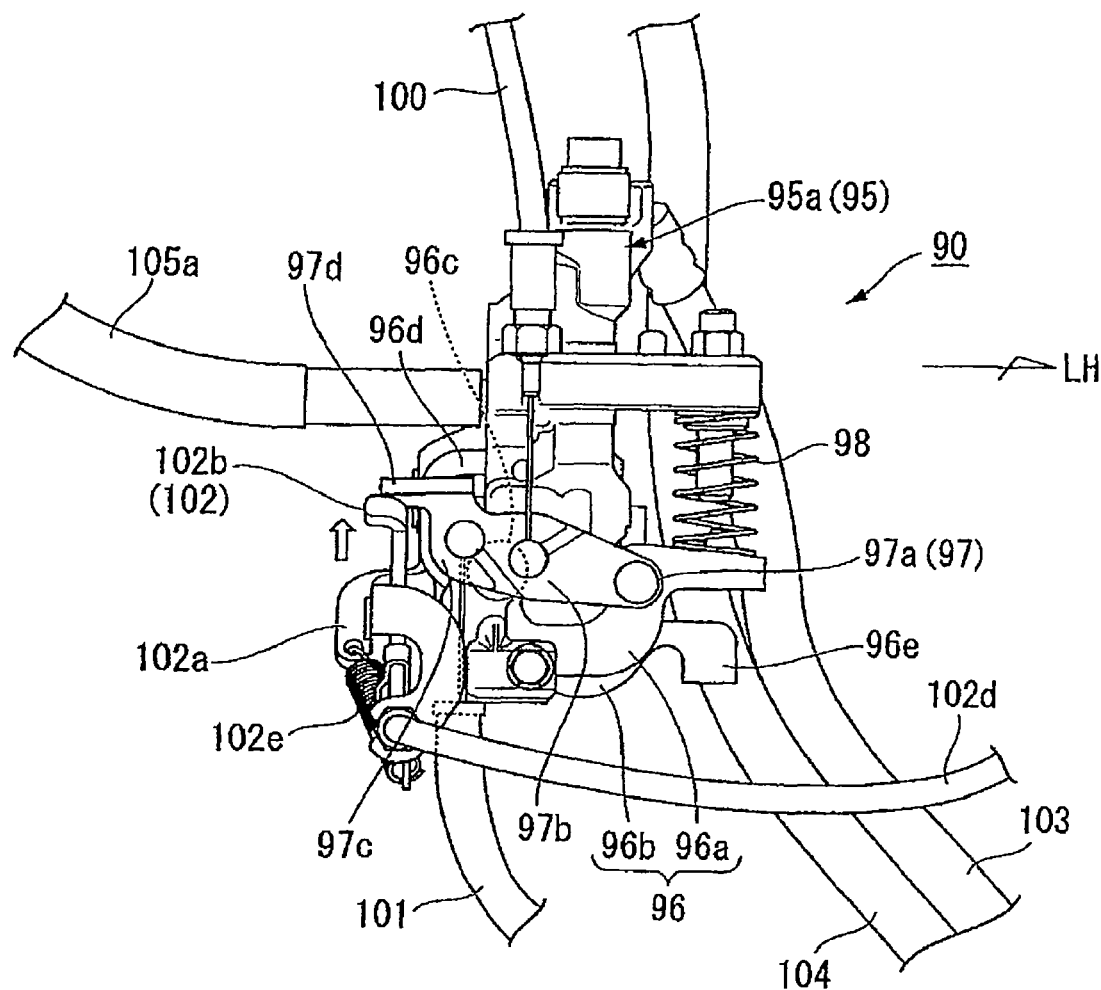
FIG. 22 is a front elevational view showing a second operation state of the operatively connected brake device.
Figure 23:
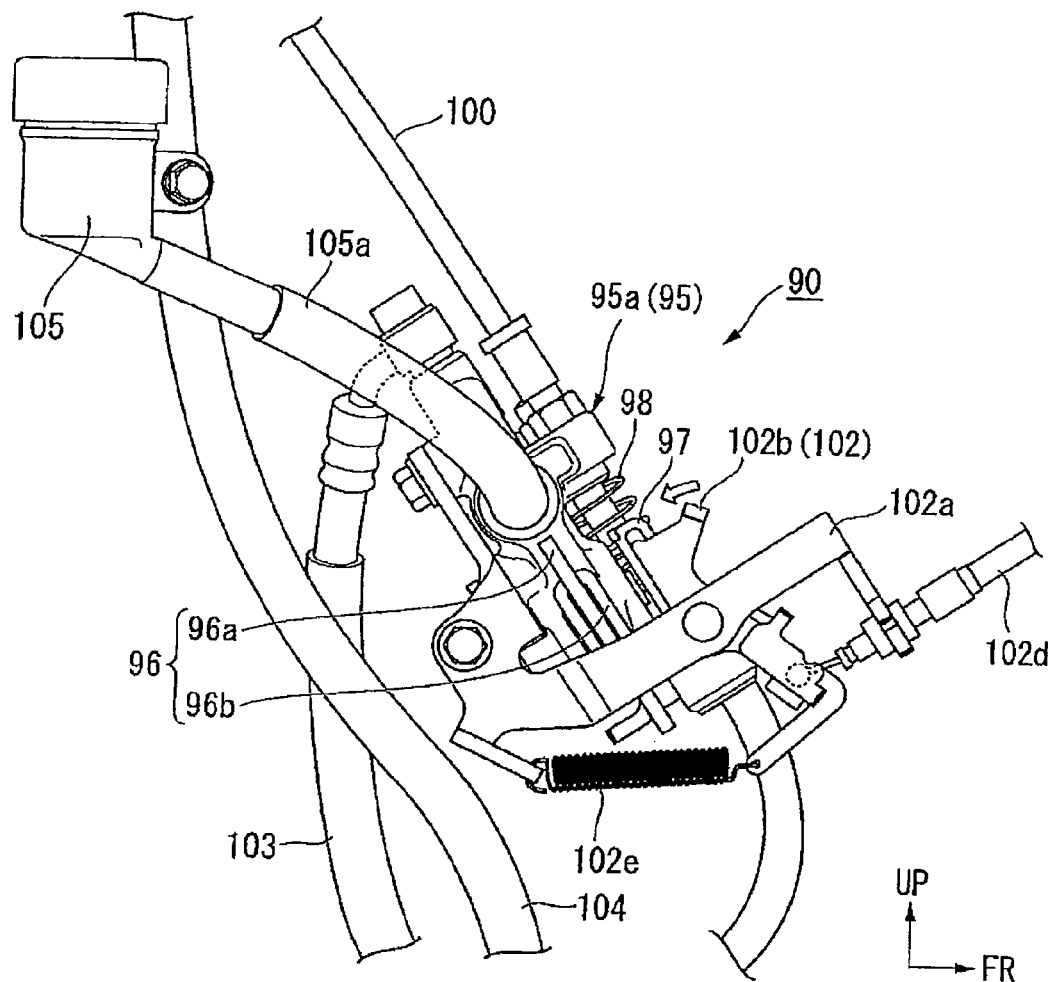
FIG. 23 is a right side elevational view showing the second operation state of the operatively connected brake device shown in FIG. 22.

The brake lock means 102 operates, from a condition (shown in FIGS. 16 and 19) before the operation of each brake 91, 92 by the operation of the operatively connected brake operator 93 via the equalizer 97, at least the mechanical brake 92 by the operation of the operatively connected brake operator 93 via the equalizer 97 (see FIGS. 20 and 21); by operating the brake lock operator 102c in this condition, the brake lock means 102 can engage the lock lever 102b with the brake lock engagement portion 97d on the second end side of the equalizer 97 (see FIGS. 22 and 23), thereby restricting the brake lock engagement portion 97d from returning to the initial condition. This makes the hydraulic brake 91 returnable to the condition before operation, while allowing only the mechanical brake 92 to be retained in the operating state. In FIG. 19, reference symbol 102e denotes a return spring that urges the lock lever 102b to the condition before operation.

As described heretofore, the flasher support structure according to the second embodiment of the present invention includes the bent portions 167a, 167b such that, as compared with the flasher support structure according to the first embodiment of the present invention, the peripheral wall portion 163 of the flasher stay 161 changes the opening rate at a midway point from the bottom wall portion 162 toward the vehicle body side.

The foregoing arrangements achieve the following effect, in addition to the basic effects of the first embodiment of the present invention. Specifically, when an external force is applied to the front flasher, the flasher stay 161 can even more readily buckle with the bent portions 167a, 167b, in particular, as the proximal point, so that the external force can be effectively made to escape.

In the flasher support structure according to the second embodiment of the present invention, the bent portions 167a, 167b are bent inwardly of the flasher stay 161 so as to form a valley shape. When the flasher stay 161 buckles, therefore, the peripheral wall portion 163 is folded inwardly of the flasher stay 161. This allows parts to be disposed around the flasher stay 161 easily.

In the flasher support structure according to the second embodiment of the present invention, the flasher stay 161 is angled so that one axial end side thereof is higher than the other. As a result, the flasher stay 161 can be made to buckle even more easily with a lateral load applied thereto.

The present invention is not limited only to the above-described embodiments. Rather, for example, the flasher cover 81 may be arranged to pass the flasher stay 61, 161 therethrough, instead of the shaft portion 41b of the front flasher 41. Additionally, an arrangement may be made, in which the flasher stay 61, 161 is supported by the front inner cover 33, instead of the front side cover 32, or supported across the front side cover 32 and the front inner cover 33. In addition, the same arrangements may be applied to a rear flasher.

The arrangements in the above-described embodiments are only one example of the present invention. It will be understood by those skilled in the art that various changes in form and detail may be made therein without departing from the spirit and scope of the invention, not to mention that the present invention is also applicable to a three-wheeled or four-wheeled saddle-riding type vehicle in addition to the motorcycle.

Although a specific form of embodiment of the instant invention has been described above and illustrated in the accompanying drawings in order to be more clearly understood, the above description is made by way of example and not as a limitation to the scope of the instant invention. It s contemplated that various modifications apparent to one of ordinary skill in the art could be made without departing from the scope of the invention which is to be determined by the following claims.

We claim:

1. A flasher support structure, comprising:
    a lighting apparatus stay having a first axial end supporting a lighting apparatus main body and a second axial end supported on a vehicle body side, said light apparatus stay being formed into a tubular shape and including
        a bottom wall portion disposed on the first axial end of said lighting apparatus stay, the bottom wall portion including a mounting hole for the lighting apparatus main body and an insertion hole for an electric wire, and
        a side wall portion extending from an outer edge portion of the bottom wall portion toward the vehicle body side such that a cross-sectional area of the side wall portion gradually increases from the bottom wall portion to the vehicle body side,
    wherein said light apparatus main body includes a light source disposed thereinside, said electric wire feeding electricity to said light source,
    wherein said lighting apparatus stay elastically supports said lighting apparatus main body and accommodates said electric wire thereinside,
    wherein the side wall portion includes a bent portion midway between the bottom wall portion and the vehicle body side,
    wherein the cross-sectional area of said side wall portion gradually increases from the bottom wall portion to the bent portion at a first rate, and
    wherein the cross-sectional area of said side wall portion gradually increases from the bent portion to the vehicle body side at a second rate which is different from the first rate.

2. The flasher support structure according to claim 1, wherein the side wall portion has a polygonal shape in cross-section.

3. The flasher support structure according to claim 1, wherein the bent portion is bent to form a valley shape that is recessed towards the interior of said lighting apparatus stay.

4. The flasher support structure according to claim 1, wherein said lighting apparatus stay is angled so that the first axial end side thereof is higher than the second axial end side.

5. The flasher support structure according to claim 1, further comprising
    a lighting apparatus cover disposed on the vehicle body side, said lighting apparatus cover being formed of an elastic body covering said lighting apparatus stay.

6. The flasher support structure according to claim 5,
    wherein said lighting apparatus cover includes an opening through which said lighting apparatus stay or said lighting apparatus main body is passed through; and
    wherein the opening has a shape that corresponds to said lighting apparatus stay or said lighting apparatus main body.

7. The flasher support structure according to claim 6, further comprising
    a leg shield including a front cover covering a forward facing part of a vehicle and an inner cover covering a rearward facing part of the vehicle,
    wherein said lighting apparatus stay is supported at an area near a joint between said front cover and said inner cover by at least one of said front cover and said inner cover; and
    wherein said lighting apparatus cover covers a portion of said front cover and said inner cover.

8. The flasher support structure according to claim 5, further comprising
    a leg shield including a front cover covering a forward facing part of a vehicle and an inner cover covering a rearward facing part of the vehicle,
    wherein said lighting apparatus stay is supported at an area near a joint between said front cover and said inner cover by at least one of said front cover and said inner cover; and
    wherein said lighting apparatus cover covers a portion of said front cover and said inner cover.

* * * * *